(12) United States Patent
Maltsev et al.

(10) Patent No.: US 8,019,026 B2
(45) Date of Patent: Sep. 13, 2011

(54) DOWNLINK PREAMBLE PROCESSING TECHNIQUES FOR INITIAL ACQUISITION

(75) Inventors: Alexander A Maltsev, Nizhny Novgorod (RU); Alexey Rubtsov, Nizhny Novgorod (RU); Andrey Pudeyev, Nizhny Novgorod (RU); Vadim Sergeyev, Nizhny Novgorod (RU); Sergey Tiraspolsky, Nizhny Novgorod (RU); Alexey Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 11/993,342

(22) PCT Filed: Jun. 30, 2005

(86) PCT No.: PCT/RU2005/000360
§ 371 (c)(1),
(2), (4) Date: Jul. 28, 2010

(87) PCT Pub. No.: WO2007/004910
PCT Pub. Date: Jan. 11, 2007

(65) Prior Publication Data
US 2010/0296611 A1    Nov. 25, 2010

(51) Int. Cl.
*H03D 1/00* (2006.01)
(52) U.S. Cl. ........ 375/343; 375/143; 375/150; 375/350; 375/355; 375/260; 375/267; 375/299; 375/349
(58) Field of Classification Search .................. 375/343, 375/143, 150, 350, 355, 260, 267, 299, 349
See application file for complete search history.

(56) References Cited

U.S. PATENT DOCUMENTS

| | | | |
|---|---|---|---|
| 7,548,579 B1 * | 6/2009 | Murphy et al. | 375/147 |
| 2004/0086027 A1 * | 5/2004 | Shattil | 375/146 |
| 2007/0019749 A1 * | 1/2007 | Gaikwad et al. | 375/260 |

* cited by examiner

*Primary Examiner* — Kabir A Timory
(74) *Attorney, Agent, or Firm* — Kacvinsky Daisak, PLLC

(57) ABSTRACT

An apparatus, system, method, and article for downlink (DL) preamble processing for initial acquisition are described. The apparatus may include an autocorrelator node to determine an autocorrelation response of samples and to detect a downlink preamble based on the autocorrelation response. The samples may include a periodic sequence having two or more periods. The apparatus may include a frequency domain matched filter processing node to perform downlink preamble recognition based on a maximum peak of a frequency domain matched filter response and on an index of the downlink preamble. Other embodiments are described and claimed.

32 Claims, 21 Drawing Sheets

DOWNLINK PREAMBLE PROCESSING TECHNIQUES FOR INITIAL ACQUISITION

BACKGROUND

Modern wireless communication systems may operate according to Institute of Electrical and Electronics Engineers (IEEE) standards such as the 802.16 standards for Wireless Metropolitan Area Networks (WMANs) including the IEEE 802.16e Draft Amendment to IEEE Standard for Local and Metropolitan Area Networks—Part 16: Air Interface for Fixed Broadband Wireless Access Systems—Physical and Medium Access Control Layers for Combined Fixed and Mobile Operation in Licensed Bands.

According to IEEE 802.16e; each frame shall start with a downlink (DL) preamble. The DL preamble is transmitted in one of three defined subcarrier sets, each subcarrier set utilizing every third subcarrier starting from some predetermined number. The subcarriers used for DL preamble are binary phase shift keying (BPSK) modulated by one from 114 codewords defined for each sector and cell.

The frequency domain (FD) structure of the DL preamble provides a periodic (3 subsymbols) structure of continuous time waveform of DL preamble in time domain (TD). Because existing fast Fourier transform (FFT) sizes are not divisible by three, it is impossible to create a sequence of samples (of length equals power of two) having three identical TD subsymbols. In other words, conventional receiver (RX) sampling (with $2^n$ samples per DL preamble) destroys the periodic structure sequence of DL preamble samples. A periodicity of the sampled DL preamble leads to increasing the complexity of synchronization schemes.

DETAILED DESCRIPTION

Figure 1:
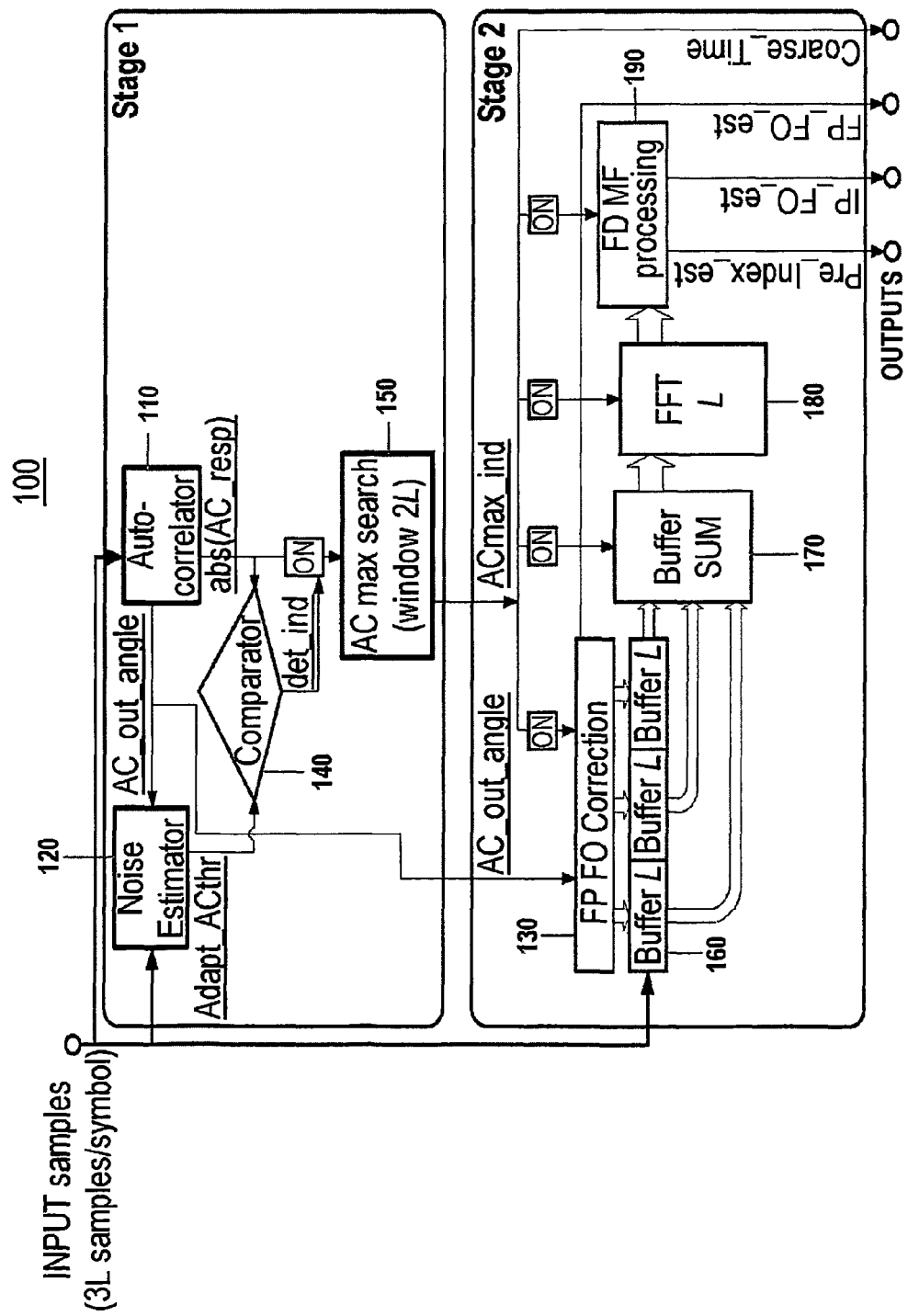
FIG. 1 illustrates one embodiment of a processing system.

FIG. 1 illustrates one embodiment of a system. FIG. 1 illustrates a block diagram of a processing system 100. In various embodiments, the processing system 100 may comprise multiple nodes. A node generally may comprise any physical or logical entity for communicating information in the processing system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, a node may comprise, or be implemented as, a computer system, a computer sub-system, a computer, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a network processor, and so forth. The embodiments are not limited in this context.

The nodes of the processing system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control, information may be communicated from and to a number of different devices or networks. The embodiments are not limited in this context.

In various implementations, the nodes of the processing system 100 may be arranged to segment a set of media information and control information into a series of packets. A packet generally may comprise a discrete data set having fixed or varying lengths, and may be represented in terms of bits or bytes. It can be appreciated that the described embodiments are applicable to any type of communication content or format, such as packets, cells, frames, fragments, units, and so forth. The embodiments are not limited in this context.

The processing system 100 may be implemented as a wired communications system, a wireless communications system, or a combination of both. For example, the processing system 100 may include one or more nodes arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The embodiments are not limited in this context.

The processing system 100 may include one or more nodes arranged to communicate information over one or more types of wireless communication media. An example of a wireless communication media may include portions of a wireless spectrum, such as the radio-frequency (RF) spectrum. In such implementations, the nodes of the system 100 may include components and interfaces suitable for communicating information signals over the designated wireless spectrum, such as one or more transmitters, receivers, transceivers, amplifiers, filters, control logic, antennas and so forth. Examples of an antenna include an internal antenna, an omni-directional antenna, a monopole antenna, a dipole antenna, an end fed antenna, a circularly polarized antenna, a micro-strip antenna, a diversity antenna, a dual antenna, an antenna array, and so forth. The embodiments are not limited in this context.

In various implementations, the processing system 100 may form part of a multi-carrier system such as a Multiple Input, Multiple Output (MIMO) system for conveying multiple data streams to multiple antennas. In such embodiments, the wireless communications media may comprise one or more multi-carrier communications channels for communicating multi-carrier communication signals. A multi-carrier channel may comprise, for example, a wideband channel comprising multiple sub-channels. The embodiments are not limited in this context.

The communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), a line card, a disc controller, video controller, audio controller, and so forth. The embodiments are not limited in this context.

The processing system 100 may comprise or form part of a network, such as a Worldwide Interoperability for Microwave Access (WiMAX) network, a broadband wireless access (BWA) network, a wireless local area network (WLAN), a wireless wide area network (WWAN), a wireless metropolitan area network (WMAN), a wireless personal area network (WPAN), a Code Division Multiple Access (CDMA) network, a Wide-band CDMA (WCDMA) network, a Time Division Synchronous CDMA (TD-SCDMA) network, a Time Division Multiple Access (TDMA) network, an Extended-TDMA (E-TDMA) network, a Global System for Mobile Communications (GSM) network, an Orthogonal Frequency Division Multiplexing (OFDM) network, an Orthogonal Frequency Division Multiple Access (OFDMA) network, a North American Digital Cellular (NADC) network, a Universal Mobile Telephone System (UMTS) network, a third generation (3G) network, a fourth generation (4G) network, a local area network (LAN), a wide area network (WAN), a metropolitan area network (MAN), the Internet, the World Wide Web, a cellular network, a radio network, a satellite network, and/or any other communications network configured to carry data. The embodiments are not limited in this context.

The processing system 100 may communicate information in accordance with one or more standards, such as standards promulgated by the Institute of Electrical and Electronics Engineers (IEEE), the Internet Engineering Task Force (IETF), the International Telecommunications Union (ITU), and so forth. In various embodiments, for example, the processing system 100 may communicate information according to one or more IEEE 802 standards including IEEE 802.11 standards (e.g., 802.11a, b, g/h, j, n, and variants) for WLANs and/or 802.16 standards (e.g., 802.16-2004, 802.16.2-2004, 802.16e, 802.16f, and variants) for WMANs. The processing system 100 may communicate information according to one or more of the Digital Video Broadcasting Terrestrial (DVB-T) broadcasting standard and the High performance radio Local Area Network (HiperLAN) standard. The embodiments are not limited in this context.

The processing system 100 may communicate information in accordance with one or more protocols, such as protocols defined by one or more IEEE 802 standards, or other standard bodies, for example. In various embodiments, the system 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth. The embodiments are not limited in this context.

The processing system 100 may comprise or be implemented by a wireless network such as a BWA network, for example. In various implementations, the wireless network may be arranged to operate according to one or more IEEE 802.16 standards. In various embodiments, the wireless network may comprise an 802.16e network operating according to the including the IEEE 802.16e Draft Amendment to IEEE Standard for Local and Metropolitan Area Networks—Part 16: Air Interface for Fixed Broadband Wireless Access Systems—Physical and Medium Access Control Layers for Combined Fixed and Mobile Operation in Licensed Bands. The embodiments are not limited in this context.

In various embodiments, the processing system 100 may comprise or be implemented by a wireless network, such as an 802.16e network. In various implementations, the processing system 100 may be arranged to perform DL preamble processing for initial acquisition. In one embodiment, for example, the processing system 100 may be arranged to perform initial acquisition comprising DL preamble (frame)

detection, DL preamble recognition (DL preamble index determination—sector and cell identification), estimation for fractional part frequency offset (FP FO) and integer part frequency offset (IP FO), and DL preamble boundary (coarse symbol timing) synchronization. The embodiments are not limited in this context.

Figure 2:
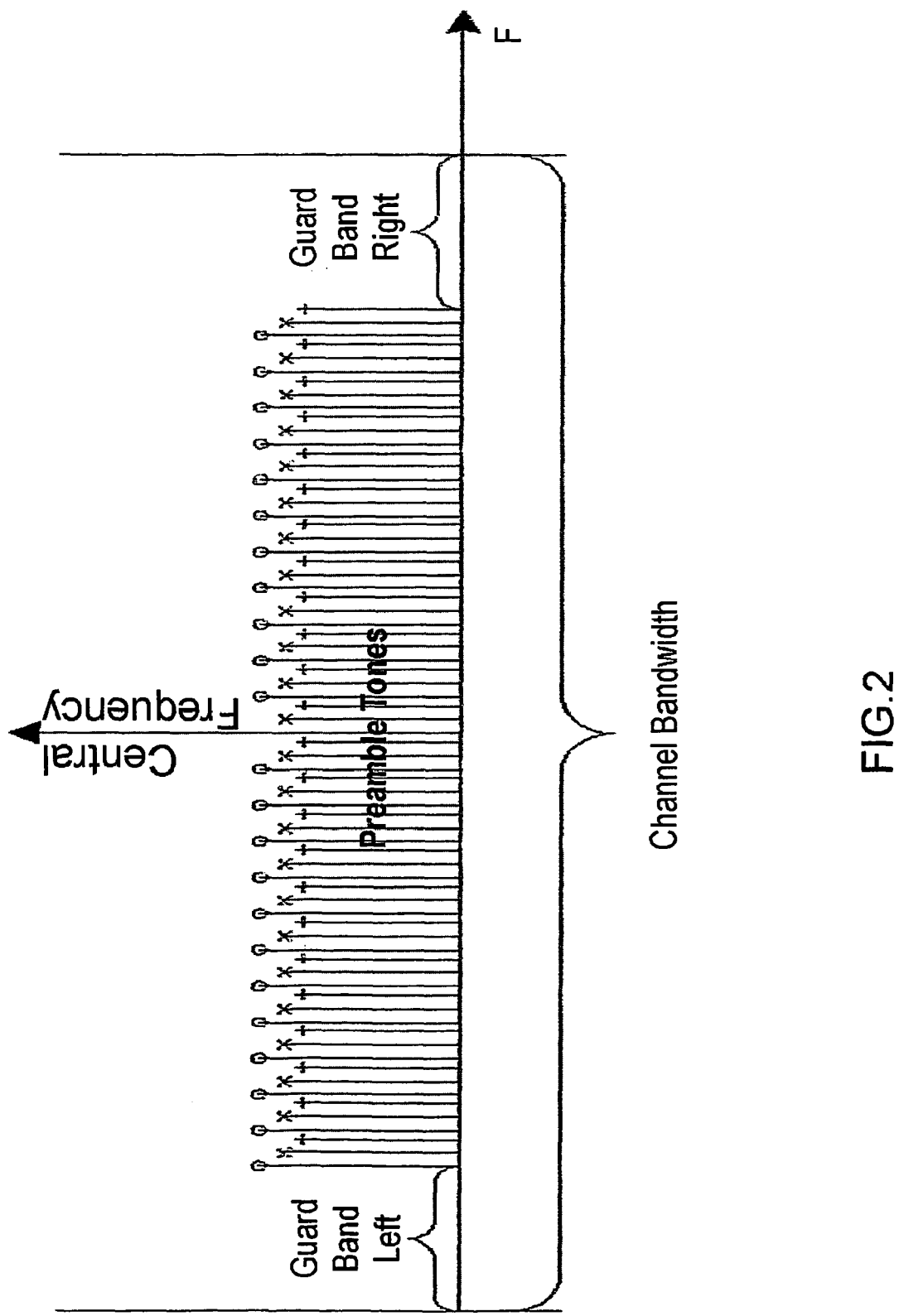
FIG. 2 illustrates one embodiment of a DL preamble structure.

FIG. 2 illustrates one embodiment of a DL preamble structure. In various embodiments, the DL preamble structure may be implemented according to the IEEE 802.16e standard. Each frame may start with a DL preamble. As illustrated in FIG. 2, subcarriers of different subsets are shown with differently-ended lines. The subcarriers used for the DL preamble structure may be modulated. For example, the subcarriers may be BPSK modulated by one from 114 codewords defined in the 802.16e standard for each sector and cell. In various implementations, the DL preamble may be transmitted in one of three defined subcarrier sets. Each subcarrier set may utilize every third subcarrier following the guard band left and ending on the guard band right. The embodiments are not limited in this context.

Figure 3:
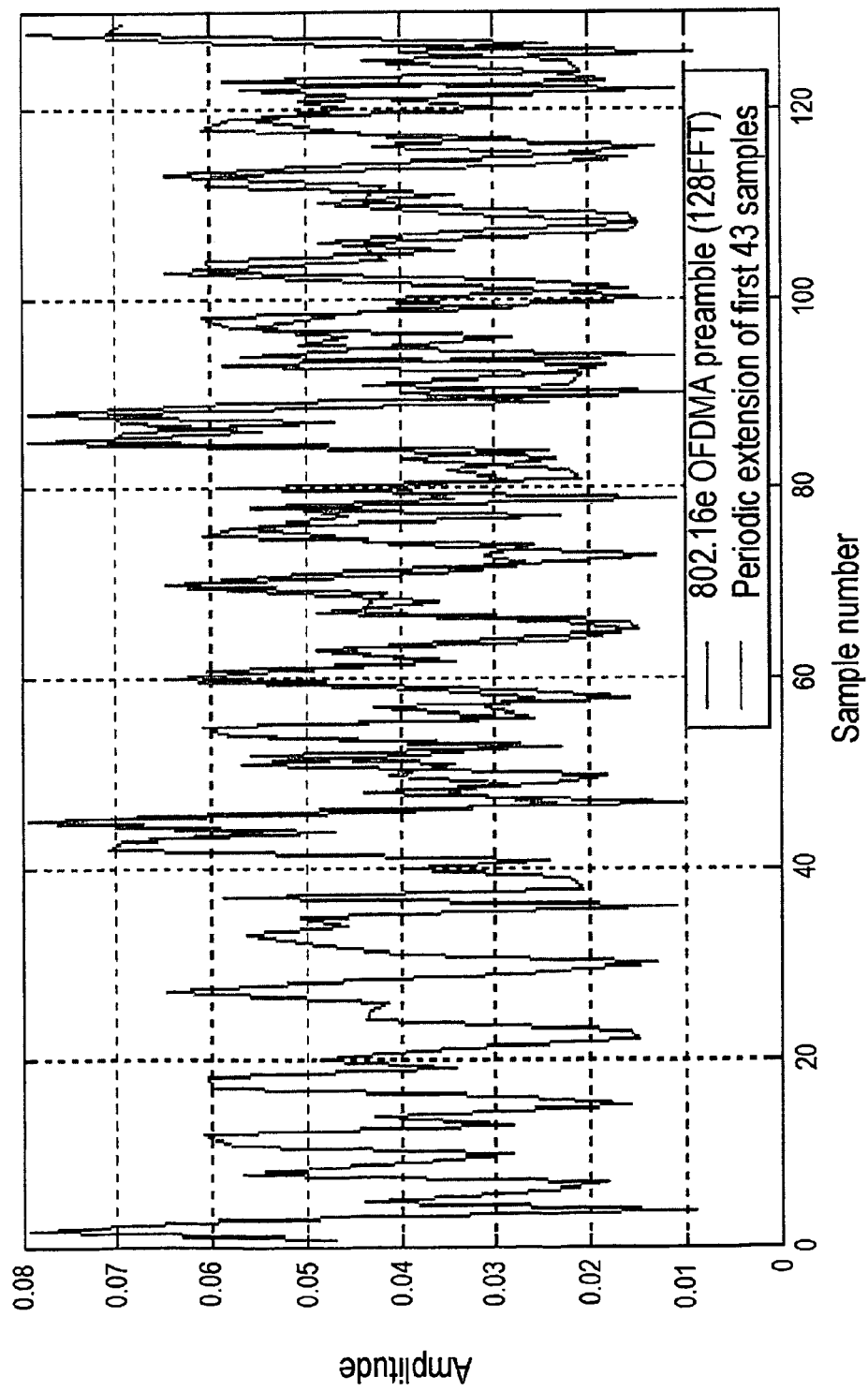
FIG. 3 illustrates one embodiment of DL preamble sampling.

FIG. 3 illustrates one embodiment of DL preamble sampling. As shown, aperiodicity of the sampled DL preamble may be demonstrated for a 128 FFT case. In various implementations, the frequency domain (FD) structure of the DL preamble may provide a periodic (3 subsymbols) structure of continuous time waveform of DL preamble in time domain (TD). Because existing FFT sizes are not divisible by three, it is impossible to create a sequence of samples (of length equal to power of two) having three identical TD subsymbols. As illustrated in FIG. 3, conventional RX sampling (with $2^n$ samples per DL preamble) may destroy the periodic structure of the sequence of DL preamble samples. Such aperiodicity of the sampled DL preamble may lead to increasing complexity of the synchronization schemes. The embodiments are not limited in this context.

The processing system 100 may be arranged to perform DL preamble (frame) detection. In various embodiments, DL preamble detection may be performed using an autocorrelation technique. The autocorrelation technique may require the incoming sampled signal to be periodic in some time interval. The embodiments are not limited in this context.

The processing system 100 may be arranged to avoid problems associated with aperiodicity of the sampled DL preamble. In various embodiments, the processing system 100 may be arranged perform modification of receiver sampling. In various implementations, a receiver sampling rate may be modified for initial acquisition. Modifying the receiver sampling rate may involve correcting the sampling rate at the receiver in order to make the sampling rate a multiple of triple symbol rate. The processing system 100 may employ various receiver side sampling approaches to produce periodic sequence of samples from a periodic in-continuous-time DL preamble waveform. In one embodiment, the periodic sequence of samples may comprise three periods of size L. The embodiments are not limited in this context.

In various embodiments, the processing system 100 may modify receiver sampling by exploiting "ternary" sampling at the initial acquisition stage. Conventional receiver sampling may use $N_{samples}=2^n$ per DL preamble. In various implementations, the processing system 100 may use initial sampling with $N^{in}_{samples}=3 L\approx 2^n=N_{samples}$ per DL preamble. In such implementations, the number of samples per DL preamble is multiple of three, and the DL preamble after receiver sampling will be a periodic sequence. For example, for FFT512 system with $N_{samples}=512$ samples per DL preamble (or 2*512 samples in case of double upsampling at RX side) the initial sampling may produce $N^{in}_{samples}=510$ samples (or 2*510 samples in case of double upsampling at RX side) per DL preamble. After DL preamble boundary synchronization, the initial sampling rate may be transferred to a conventional receiver sampling rate for data OFDM symbols processing, for example. The embodiments are not limited in this context.

In various embodiments, the processing system 100 may modify receiver sampling by exploiting triple sampling rate at the receiver side. For example, for FFT512 system with $N_{samples}=512$ samples per DL preamble initial triple upsampling can produce $N^{in}_{samples}=3*512$ samples per DL preamble. The embodiments are not limited in this context.

In various implementations, the processing system 100 may perform DL preamble processing in two stages. In various embodiments, the first stage may comprise frame detection, FP FO estimation, and coarse timing synchronization. The second stage may comprise IP FO offset estimation and DL preamble recognition (DL preamble index determination—sector and cell identification). The embodiments are not limited in this context.

The processing system 100 may receive input comprising TD samples with a modified initial sampling rate. In various embodiments, the TD samples may be produced by an analog to digital converter (ADC). In various implementations, in the first stage, the input TD samples may be provided to an autocorrelator (AC) node 110 and to a noise estimator node 120. At each sample clock, the angle value of complex AC response (AC_out_angle) may be provided from the AC node 110 to a FP FO correction node 130 and to the noise estimator node 120. At each sample clock, the magnitude of the autocorrelation response (abs(AC_resp)) may be compared against the adaptive threshold value (Adapt_ACthr) by a comparator 140. The adaptive threshold value may be computed by the noise estimator node 120 on the basis of current noise power estimate. The embodiments are not limited in this context.

Figures 4A, 4B, 4C:
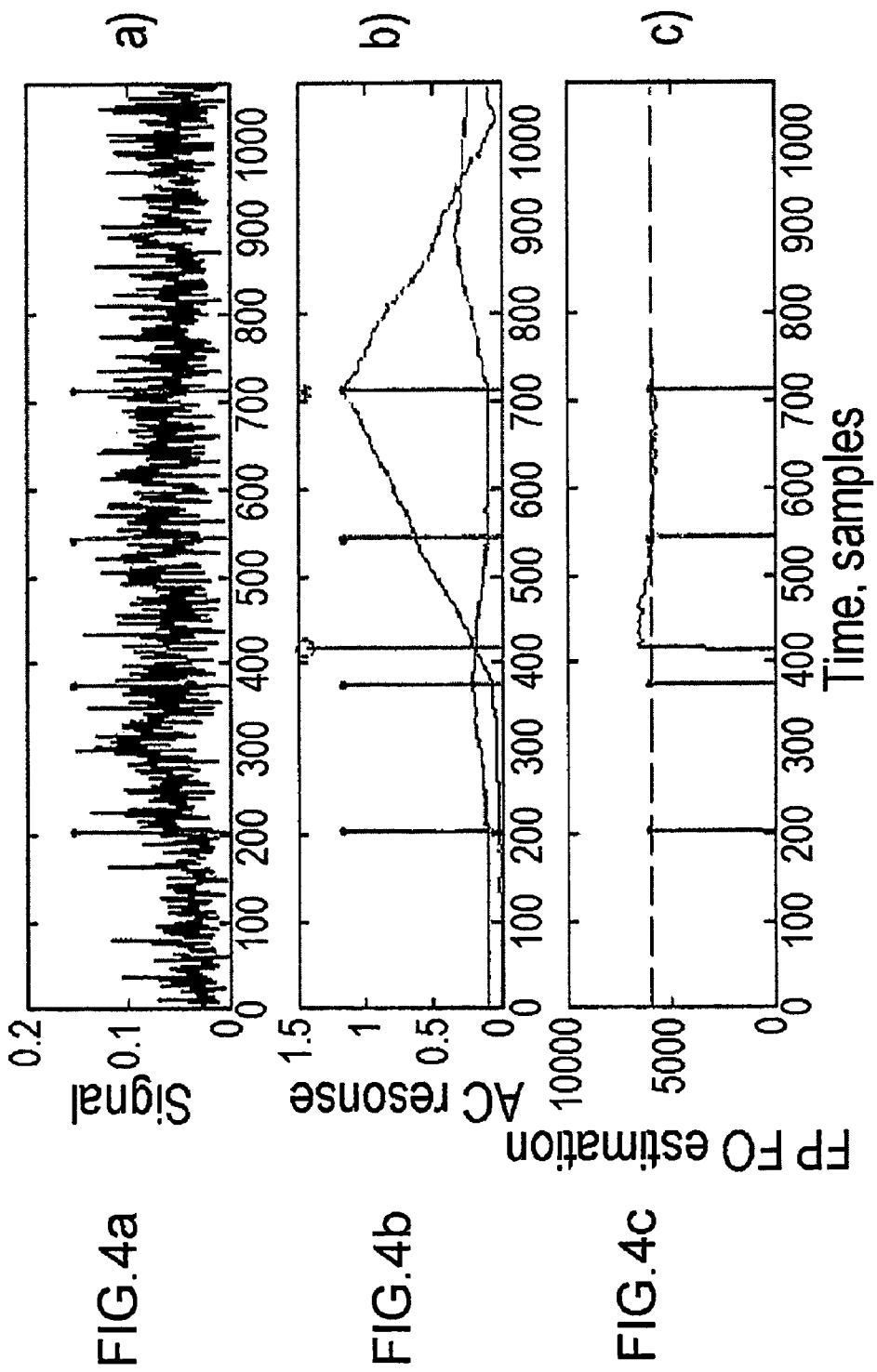
FIG. 4a illustrates one embodiment of received DL preamble magnitude.
FIG. 4b illustrates one embodiment autocorrelation response and adaptive threshold.
FIG. 4c illustrates one embodiment of frequency offset estimation.

FIG. 4a illustrates one embodiment of received of DL preamble magnitude. As shown, FIG. 4a illustrates a real time diagram comprising DL preamble (magnitude) with random arrival time and additive noise. The embodiments are not limited in this context.

FIG. 4b illustrates one embodiment of AC response and adaptive threshold. As shown, FIG. 4b illustrates a real time diagram comprising magnitude of AC response (dark curve) and adaptive threshold (light curve). The embodiments are not limited in this context.

FIG. 4c illustrates one embodiment of frequency offset estimation. As shown, FIG. 4c illustrates FP FO estimate (angle value of complex autocorrelator response). The embodiments are not limited in this context.

In various implementations, the DL preamble may be considered to be detected when the magnitude of the autocorrelation response exceeds the adaptive threshold level. Referring to FIG. 4b, the moment of detection is indicated by the stem with a circle. After the detection moment, the AC max search node 150 (see FIG. 1) may search the autocorrelation response maximum (peak) on the next 2 L samples. The AC max search node 150 may determine the index of the sample (time moment), which corresponds to the maximum of autocorrelation response—coarse estimate of DL preamble boundary. Referring to FIG. 4b, the DL preamble boundary estimate is indicated by the stem with an asterisk. In various embodiments, the input samples may be stored in a buffer of size 5 L during this procedure. The embodiments are not limited in this context.

In various implementations, in the second stage, the processing system 100 may be arranged to perform DL preamble recognition and IP FO estimation. The processing node 100 may be arranged to exploit 3 L TD samples preceding the estimated DL preamble boundary. The 3 L samples can be stored in a buffer 160, for example. The embodiments are not limited in this context.

In various embodiments, the FP FO correction node 130 may be arranged to rotate the phase of each 3 L TD sample in accordance with the FP FO estimate. The corrected 3 L samples may be provided to a buffer summator node 170. The buffer summator node 170 may be arranged to combine 3 L TD samples to produce L TD samples. The L samples may be provided to a FFT node 180 of size L, for example. The FFT node 180 may be arranged to produce L frequency domain samples, which are input to the FD MF processing node 190. The FD MF processing node 190 may perform matched filtering (MF) across FD samples to estimate IP FO (IP_FO_est) and determine the index of the received DL preamble (Pre_Index_est). The embodiments are not limited in this context.

In various implementations, the processing system 100 may output a DL preamble boundary estimate (Coarse_Time), an index of received DL preamble (Pre_Index_est), and IP and FP frequency offset estimates (IP_FO_est and FP_FO_est). The embodiments are not limited in this context.

The processing system 100 may be arranged to perform frame detection, FP FO estimation, and coarse timing synchronization. In various embodiments, a continuous time signal r(t) received at the RX with some frequency offset can be expressed as:

$$r(t) = x(t) \cdot e^{j2\pi F_0 t} + \xi(t),$$

where $x(t) = h(t) \otimes s(t)$ is the transmitted signal corrupted by the multipath (frequency-selective) channel, $F_0$ is the frequency offset, $\xi(t)$ is additive noise. The embodiments are not limited in this context.

In various embodiments, the received DL preamble after the ADC with modified (initial) sampling rate can be represented as a sampled sequence of size 3 L:

$$r(k) = x(k) \cdot e^{j\Omega_0 k} + \xi(k), k \in [0, \ldots, 3L-1],$$

where k is the index of the TD sample, $\Omega_0$ is the digital frequency offset, L is the length of a subsymbol of the DL preamble. The embodiments are not limited in this context.

In various implementations, initial acquisition based on DL preamble processing may assume that there is no synchronization between a base station (BS) and a subscriber station (SS). The tolerable frequency deviation specified in IEEE 802.16e for the BS is ±4 ppm. But, the reference accuracy of the SS is ±20 ppm. Thus, over the duration of one DL preamble subsymbol (89/3 μs), the total phase shift may reach 2π*24 ppm*5.4 GHz*89/3 μs=24 radians≈4 cycles. The embodiments are not limited in this context.

It can be appreciated that a large frequency offset can significantly reduce the performance of the communication system. In various embodiments, frequency offset may be represented in two parts:

$$\Omega_0 = 2\pi F_0 T_s = \omega_{FP} + \Omega_{IP}, \text{ where } \omega_{FP} = \frac{\mu}{L}, \mu \in (-\pi, \pi) \text{ is FP FO,}$$

$$\text{and } \Omega_{IP} = 2\pi \frac{M}{L}, M \in [-m_0, \ldots, m_0] \text{ is IP FO.}$$

The embodiments are not limited in this context.

Figure 5:
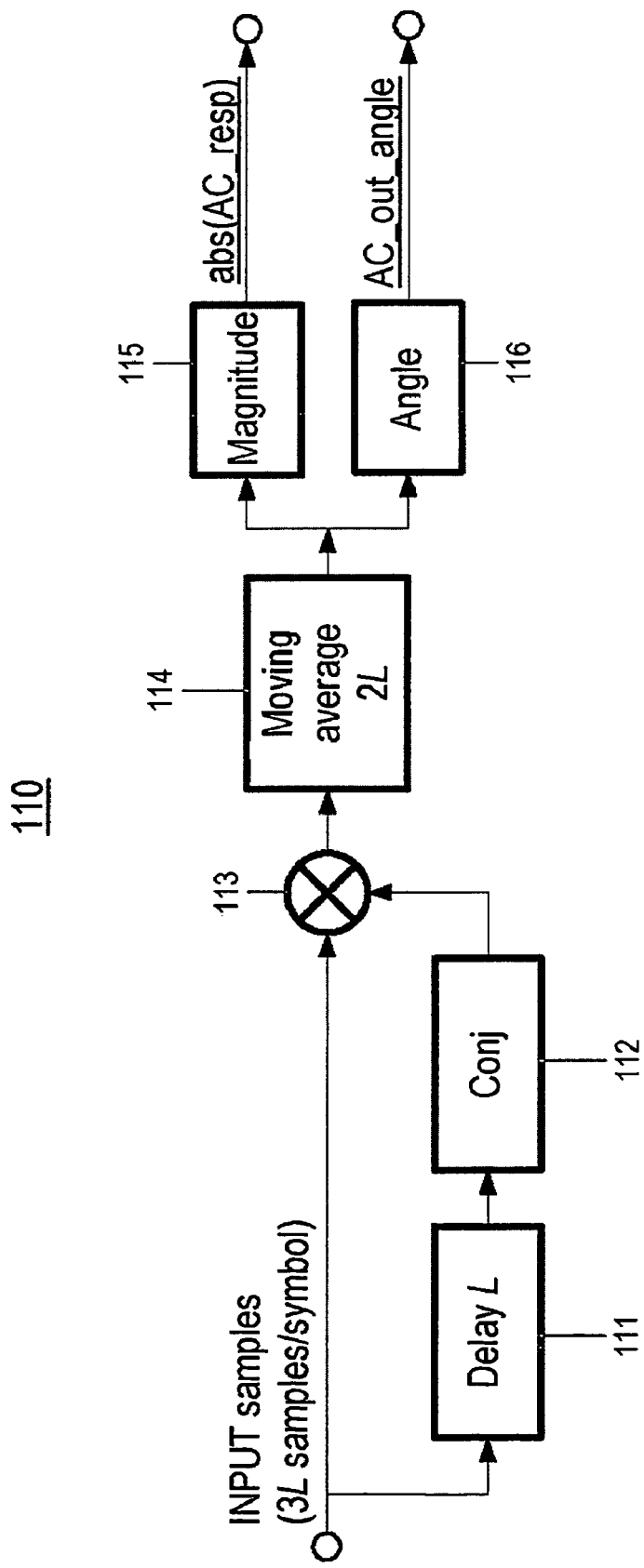
FIG. 5 illustrates one embodiment of an autocorrelator (AC) node.

FIG. 5 illustrates one embodiment of an AC node 110. As shown, the AC node 110 may comprise multiple blocks. The blocks may comprise, or be implemented as, one or more systems, sub-systems, processors, devices, machines, tools, components, circuits, registers, applications, programs, subroutines, or any combination thereof, as desired for a given set of design or performance constraints. In various embodiments, the blocks may be connected by one or more communications media. Communications media generally may comprise any medium capable of carrying information signals. For example, communication media may comprise wired communication media, wireless communication media, or a combination of both, as desired for a given implementation. The embodiments are not limited in this context.

The AC node 110 may be arranged to perform DL preamble (frame) detection. In various embodiments, the AC node 110 may perform IEEE 802.16e frame detection in frequency selective channels using an autocorrelation algorithm suitable for periodic training sequences. Since signal periodicity is invariant to multipath (frequency-selective) distortion, the AC node 110 may coherently accumulate signal energy and effectively detect the preamble. The embodiments are not limited in this context.

As shown in FIG. 5, for example, the AC node 110 may comprise a delay block 111, a conjugator block 112, a multiplier 113, a moving average block 114, a magnitude block 115, and an angle block 116. In various embodiments, the delay block 111 may be arranged to exploit a delay of size L, and the moving average block 114 may use a moving average scheme of size 2 L. The embodiments are not limited in this context.

In various implementations, the output of the moving average block 114 may comprise a complex autocorrelation response:

$$A(k) = \sum_{i=0}^{2L-1} r(k-i) r^*(k-i-L).$$

The magnitude block 115 may output the magnitude of the complex autocorrelation response A (abs(AC_resp)), which may be used for frame detection by comparing against the adaptive threshold value. The embodiments are not limited in this context.

The angle block 116 may output the angle of the autocorrelation response (AC_out_angle). In various embodiments, the angle of the autocorrelation response may represent a frequency offset estimate such as a FP FO estimate. In cases of large frequency offsets, the angle of the autocorrelation response may represent only the fractional part of the frequency offset estimate. As shown FIG. 4c, the accuracy of the FP FO estimate improves as the accumulated magnitude of the complex autocorrelation response goes to its maximum. The final estimate of the FP FO may be determined based of the angle value of the complex autocorrelation response at the moment when the maximum is achieved. The embodiments are not limited in this context.

In various implementations, the FP FO estimate may be used for the sampled signal phase correction. At each sample clock, the angle value of the complex AC response may be provided to the FP FO correction node 130 and to the noise estimator node 120. The embodiments are not limited in this context.

Figure 6:
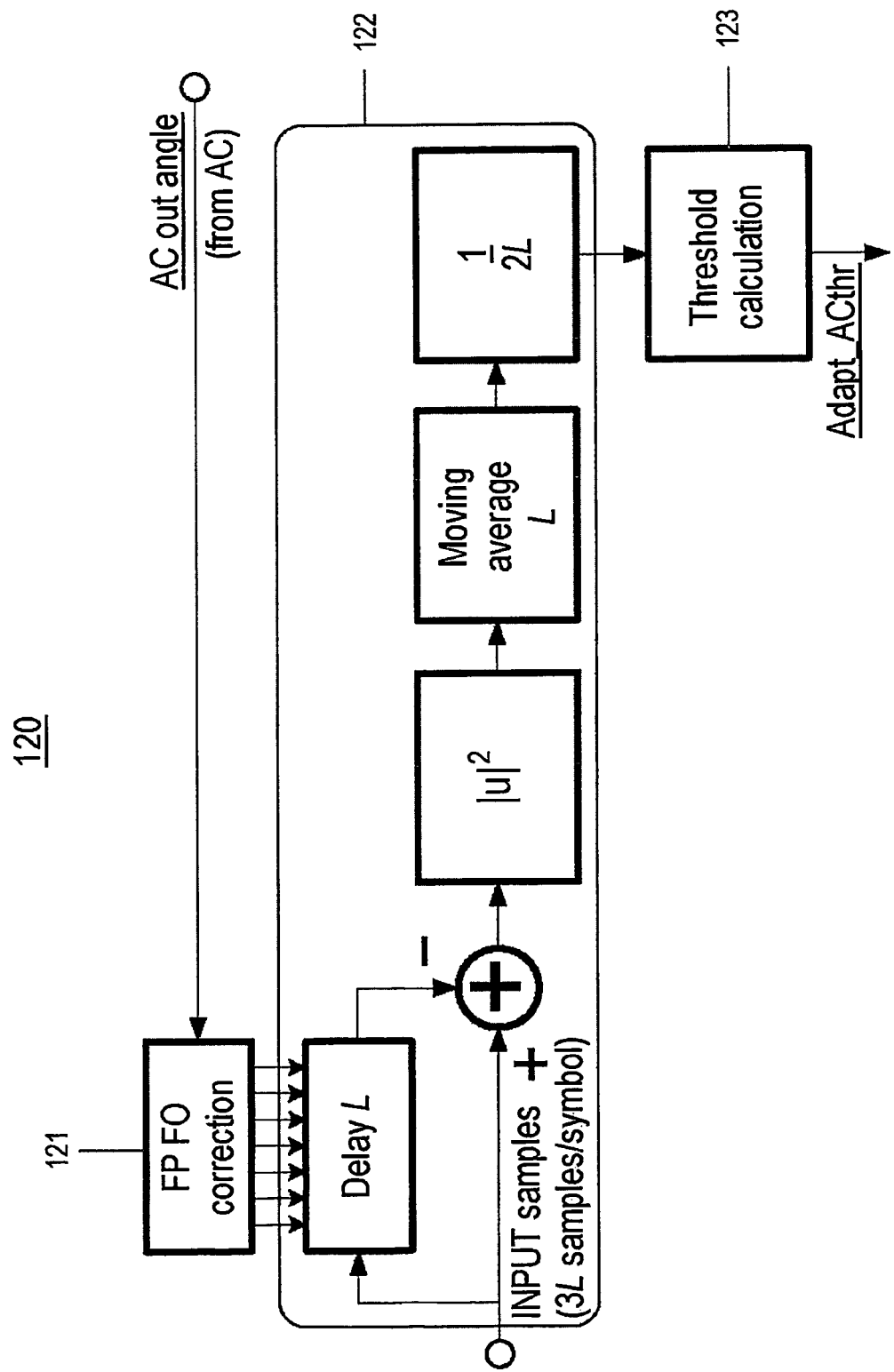
FIG. 6 illustrates one embodiment a noise estimator node.

FIG. 6 illustrates one embodiment of a noise estimator node 120. As shown, the noise estimator node 120 may comprise multiple blocks. The blocks may comprise, or be implemented as, one or more systems, sub-systems, processors, devices, machines, tools, components, circuits, registers, applications, programs, subroutines, or any combination thereof, as desired for a given set of design or performance constraints. In various embodiments, the blocks may be connected by one or more communications media. Communications media generally may comprise any medium capable of carrying information signals. For example, communication media may comprise wired communication media, wireless communication media, or a combination of both, as desired for a given implementation. The embodiments are not limited in this context.

In various embodiments, the noise estimator node 120 may be arranged to provide adaptive control of a threshold value. As shown in FIG. 6, for example, the noise estimator node 120 may comprise a FP FO correction block 121, a noise power level estimator block 122, and a threshold calculation block 123. In various implementations, the noise estimator node 120 may calculate the adaptive threshold revel on the basis of a current noise power estimate at each sample clock calculated by the noise power level estimator block 122. The embodiments are not limited in this context.

In various embodiments, the FP FO correction block 121 may be arranged to enhance the performance of the noise estimator node 120. For example, on the basis of the current FP FO estimate, the FP FO correction block 121 may correct the phases of delayed samples to compensate for signal aperiodicity caused by the fractional part of frequency offset. The embodiments are not limited in this context.

In various embodiments, the threshold calculation block 123 may compute the adaptive threshold level according to the following formula:

$$l_{thr}(k) = K_L \hat{\sigma}_\xi^2(k) \sqrt{-L \ln(P_{FA})},$$

where $K_L$ is a constant depending on L, $\hat{\sigma}_\xi^2(k)$ is the current noise power estimate, and $P_{FA}$ is the target level of false alarm probability. The adaptive threshold value may be proportional to the current noise power estimate and maintain a target false alarm probability level over the whole operational signal-to-noise (SNR) range. The embodiments are not limited in this context.

The processing system 100 may be arranged to perform integer part of frequency offset (IP FO) estimation and preamble recognition. As shown in FIG. 1, for example, the processing system 100 may comprise the FP FO correction node 130, a buffer 160 (size 3 L), a buffer summator node 170, a FFT node 180 (size L), and a FD MF processing node 190 for DL preamble recognition and IP FO estimation. The results of the signal processing may comprise estimates of the transmitted DL preamble index and IP FO expressed in units of triple subcarrier spacing, for example. The embodiments are not limited in this context.

The FP FO correction node 130 may be arranged to rotate the phase of each 3 L TD sample before the buffer summator node 170. In various implementations, the phase rotation for each sample may correspond to the FP FO estimate $\hat{\omega}_{FP}$ and may be calculated using the autocorrelation response angle corresponding to the DL preamble boundary estimate. In various embodiments, the resulting signal can be expressed as:

$$r'(k) = r(k)e^{-j\hat{\omega}_{FP}k}$$
$$= x(k) \cdot e^{j(\Omega_0 - \hat{\omega}_{FP})k} + \xi'(k) \approx$$
$$\approx x(k) \cdot e^{j\Omega_{IP}k} + \xi'(k), k \in [0, \ldots, 3L-1]$$

After accurate FP FO correction, the 3 L TD samples may comprise a periodic sequence with three periods of size L. In various embodiments, the buffer summator node 170 may be arranged to combines the 3 L TD samples in the following manner: each $i^{th}$ sample of the first buffer of size L is added with the $i^{th}$ samples of the second and third buffers of size L:

$$r''(n) = \frac{1}{3} \sum_{i=0}^{2} r'(n+iL) \approx x(n) \cdot e^{j\Omega_{IP}n} + \xi''(n), n \in [0, \ldots, L-1]$$

In various embodiments, combining may form a TD sequence of size L for FFT and increases the SNR by approximately 5 dB. The signal may pass through the FFT as follows:

$$R(l) = \sum_{i=0}^{L} r''(i)e^{-j2\pi \frac{il}{L}}$$
$$\approx \sum_{i=0}^{L} x(i)e^{j\Omega_{int}i}e^{-j2\pi \frac{il}{L}} + \zeta(l)$$
$$= \sum_{i=0}^{L} x(i)e^{j2\pi \frac{M-l}{L}i} + \zeta(l) =$$
$$= X(\mathrm{mod}(l-M, L)) + \zeta(l), l \in [0, \ldots, L-1],$$

where l is the index of the FD sample, X(l) represents corrupted (by frequency-selective channel, etc.) binary codeword which modulated the DL preamble subcarriers at the TX side, M represents the IP FO. In various implementations, the FD signal R(l) is then fed to the FD MF processing block 190. The embodiments are not limited in this context.

Figure 7:
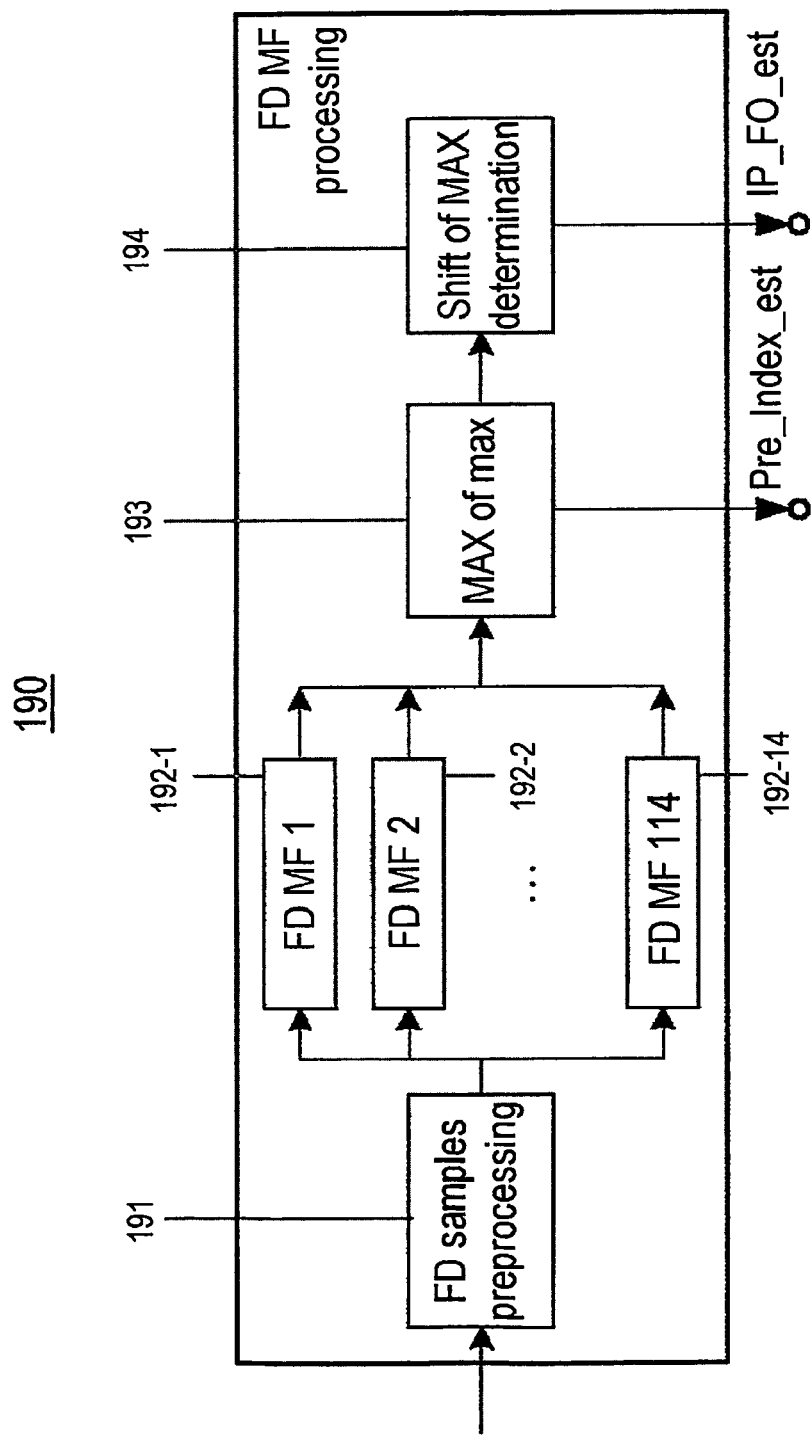
FIG. 7 illustrates one embodiment of a FD matched filter (FD MF) processing node.

FIG. 7 illustrates one embodiment of a FD MF processing node 190. As shown, FD MF processing node 190 may comprise multiple blocks. The blocks may comprise, or be implemented as, one or more systems, sub-systems, processors, devices, machines, tools, components, circuits, registers, applications, programs, subroutines, or any combination thereof, as desired for a given set of design or performance constraints. In various embodiments, the blocks may be connected by one or more communications media. Communications media generally may comprise any medium capable of carrying information signals. For example, communication media may comprise wired communication media, wireless communication media, or a combination of both, as desired for a given implementation. The embodiments are not limited in this context.

The FD MF processing node 190 may comprise a FD samples preprocessing block 191, FD matched filters (FD MF) 192-1-n, where n represents a positive integer value, a Max of max block 193, and a shift of Max determination block 194. In various embodiments, the FD MF processing node 190 may comprise 114 matched filters (MF 1-114) 192-1-114. The coefficients of each MF may be matched to the binary codewords of the corresponding DL preamble in the frequency domain. The embodiments are not limited in this context.

In various embodiments, the FD samples preprocessing block 191 may receive input FD samples comprising FD samples obtained from the FFT node 180 (size L). The input FD samples may represent a distorted (by additive noise, frequency offset, frequency-selectivity of the channel, etc.) binary codeword which modulated the DL preamble subcarriers at the TX side. The embodiments are not limited in this context.

In various embodiments, convolution with FD MF may be implemented as a summation of the input FD samples with positive or negative signs. It can be appreciated that for the frequency-selective channel, the differential detection of the codeword may be more suitable for DL preamble recognition based on FD MF. In various implementations, the FD samples preprocessing block 191 may be used to form the differential codeword from the input FD samples. The embodiments are not limited in this context.

In various embodiments, the MAX of max block 193 may be arranged to search for peaks in the response of each FD MF 192-1-114 and select the largest peak across all FD MF responses (e.g., 114 outputs). In various implementations, the index of the FD MF with the greatest peak may represent the estimate of the DL preamble index (Pre_Index_est). The embodiments are not limited in this context.

In various embodiments, the Shift of MAX determination block 194 may be arranged to determine the shift of the greatest peak from its position corresponding to zero IP FO. In various implementations, the IP FO estimate (IP_FO_est) may be calculated on the basis of the shift value in FD samples. Each FD sample may correspond to triple subcarrier spacing. The embodiments are not limited in this context.

Figure 8:
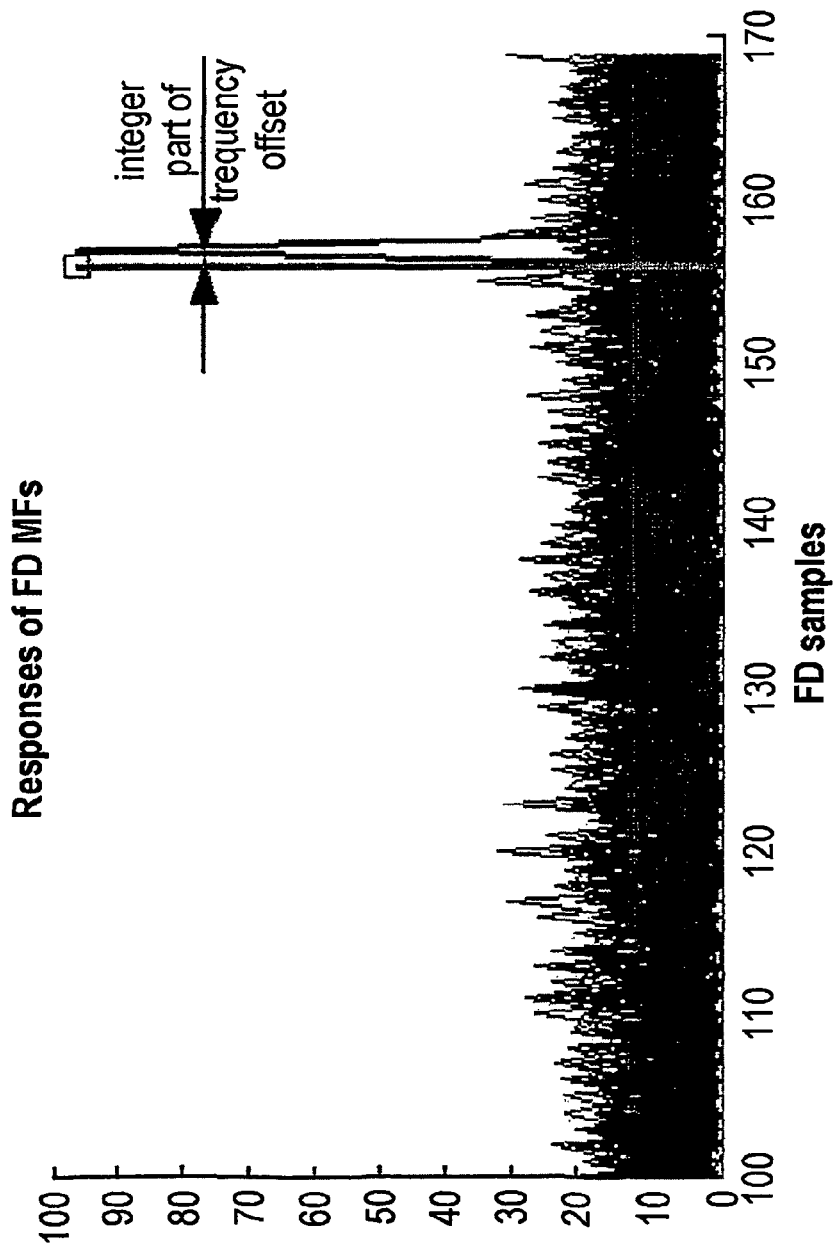
FIG. 8 illustrates one embodiment of a FD MF processing node operation.

FIG. 8 illustrates one embodiment of a FD MF processing node operation. As shown, FIG. 8 illustrates determining the shift of the greatest peak from its position corresponding to zero IP FO. In various implementations, the IP FO estimate (IP_FO_est) may be calculated on the basis of the shift value in FD samples, where each FD sample corresponds to triple subcarrier spacing. The embodiments are not limited in this context.

It can be appreciated that the procedure of IP FO estimation has a very wide FO resolution range. Resolution is limited only by the width of the guard band, which can be up to ±12 triple subcarrier spacings for FFT512 (more than ±300 kHz). The embodiments are not limited in this context.

The processing system 100 may be arranged to perform various processing techniques for codeword recognition. In various implementations, the processing system 100 may perform codeword recognition using Matched Filter (MF) processing and/or Differential MF (Diff MF) processing. The embodiments are not limited in this context.

In various embodiments, Diff MF processing may comprise inputting the phase differences of neighboring subcarriers to matched filters such as FD MF 192-1-114, for example. The set of reference signals may be obtained in similar manner such that each reference signal is the phase difference sequence of neighboring subcarriers contained in the subcarrier set corresponding to particular codeword. The embodiments are not limited in this context.

In various implementations, a phase difference sequence used as the input signal to the matched filters may be obtained from the incoming signal as follows:

$$\hat{P}(l) = \arg[R(l)] - \arg[R(l+1)]$$
$$= \arg[X(k_{l,M})] - \arg[X(k_{l+1,M})] + \varsigma(l) =$$
$$= \arg[H(k_{l,M})] + \arg[S_n(k_{l,M})] - \arg[H(k_{l+1,M})] -$$
$$\arg[S_n(k_{l+1,M})] + \varsigma(l) \approx$$
$$\approx \arg[S_n(k_{l,M})] - \arg[S_n(k_{l+1,M})]$$
$$= P_n(k_{l,M})$$

where sequence S(k) represents binary codeword which modulated the DL preamble subcarriers at the TX side, H(k) is transfer function of frequency-selective channel.

The reference signal to each MF is the phase difference sequence obtained from one of the DL preamble pseudo random noise (PN) codes as follows:

$$P_n(i) = \arg[S(i)] - \arg[S(i+1)], i \in [0, \ldots, L_{DLpre}-2],$$

where n is a preamble number. The embodiments are not limited in this context.

In various embodiments, MF processing may comprise using the direct phase values of subcarriers instead of phase differences. The embodiments are not limited in this context.

Figures 9A, 9B:
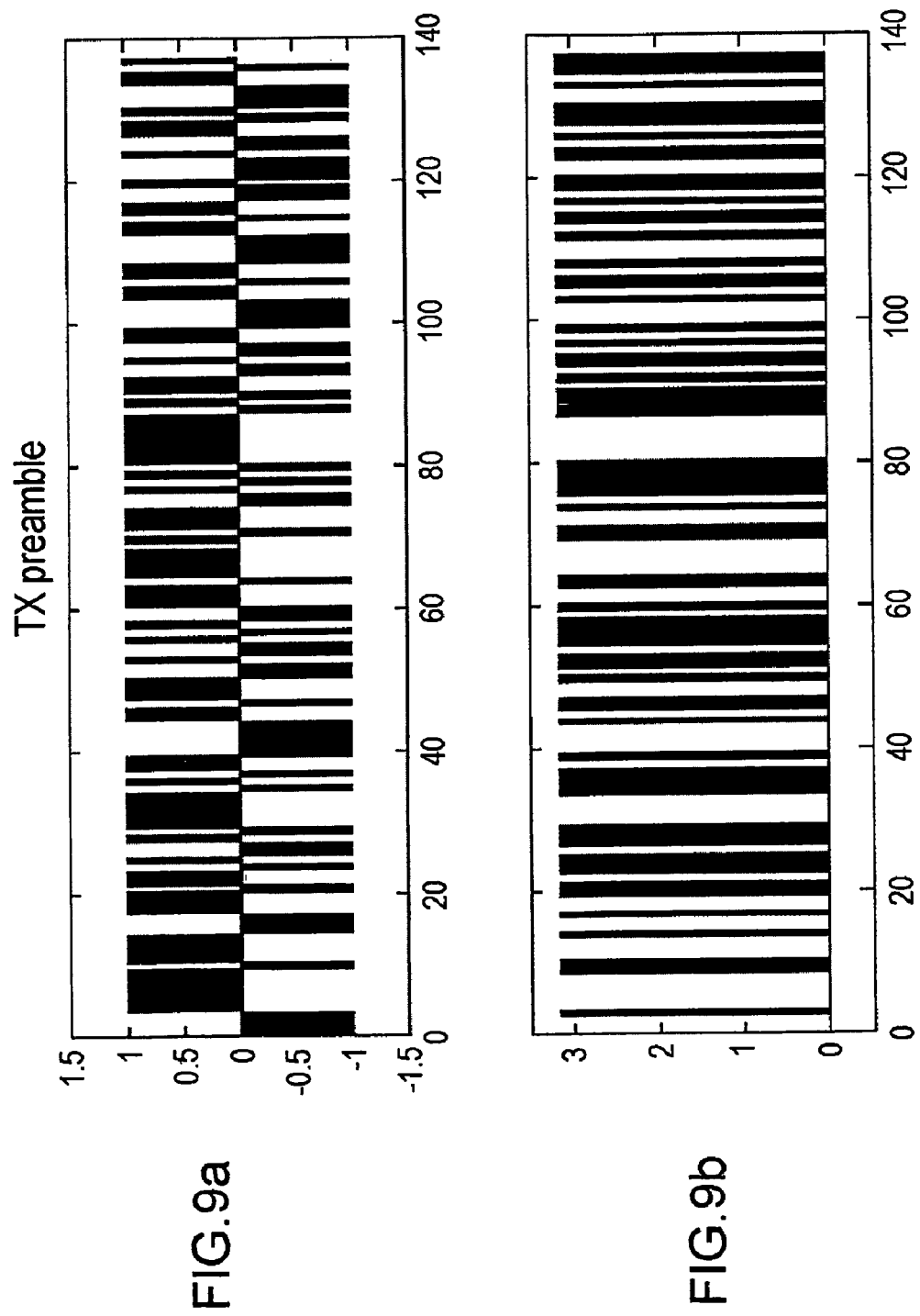
FIG. 9a illustrates one embodiment of a preamble pseudo random noise (PN) code.
FIG. 9b illustrates one embodiment of a differential PN code.

FIG. 9a illustrates one embodiment of a PN code. As shown, FIG. 9a illustrates a PN code of a TX preamble. The embodiments are not limited in this context.

FIG. 9b illustrates one embodiment of a differential PN code. As shown, FIG. 9b illustrates a differential PN code of a TX preamble. The embodiments are not limited in this context.

Figure 9C:
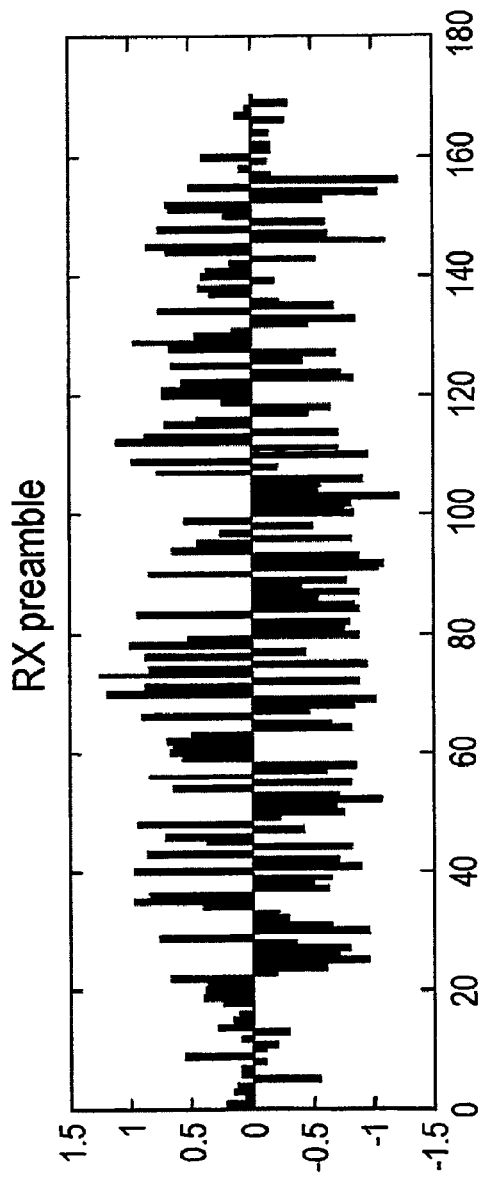
FIG. 9c illustrates one embodiment of a preamble PN code.

FIG. 9c illustrates one embodiment of a preamble PN code. As shown, FIG. 9c illustrates a PN code of a RX preamble. The embodiments are not limited in this context.

Figure 9D:
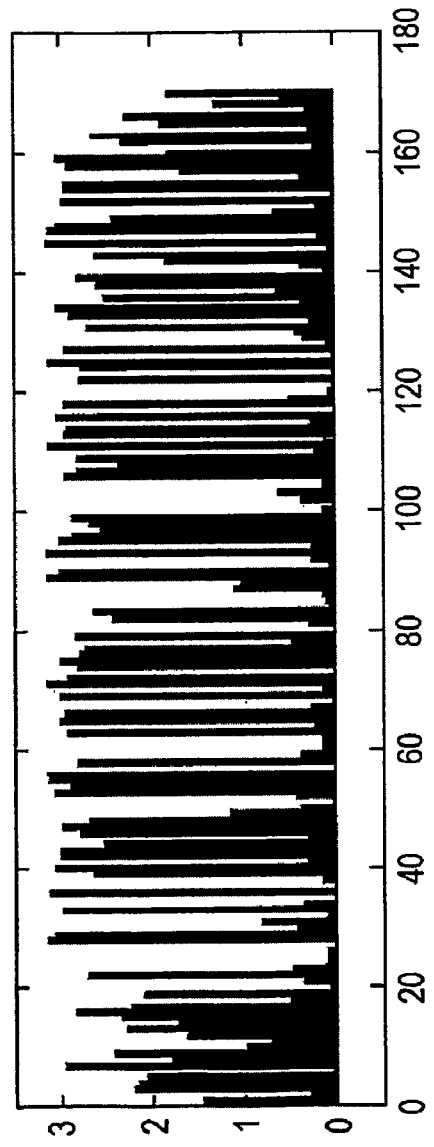
FIG. 9d illustrates one embodiment of a differential PN code.

FIG. 9d illustrates one embodiment of a differential PN code. As shown, FIG. 9d illustrates a differential PN code of a RX preamble. The embodiments are not limited in this context.

FIGS. 9a-9d illustrate recognition properties of MF processing and Diff MF processing. As shown, the four bar graphs illustrate the transformation of the preamble after passing through the channel. In this example, the PN code of DL preamble for 512 FFT is used. For convenience, the fact that the PN code is mapped onto every third subcarrier is not considered, and the guard bands are not shown. The first two bar graphs of FIGS. 9a and 9b illustrate the preamble PN code and the differential PN code. The resulting preamble frequency domain signals (real part) after the channel and noise addition are shown for both cases in the second pair of graphs of FIGS. 9c and 9d. For both cases, the channel conditions and noise environment are identical. As shown, the differential signal is more robust to the channel distortion. The embodiments are not limited in this context.

Figure 10:
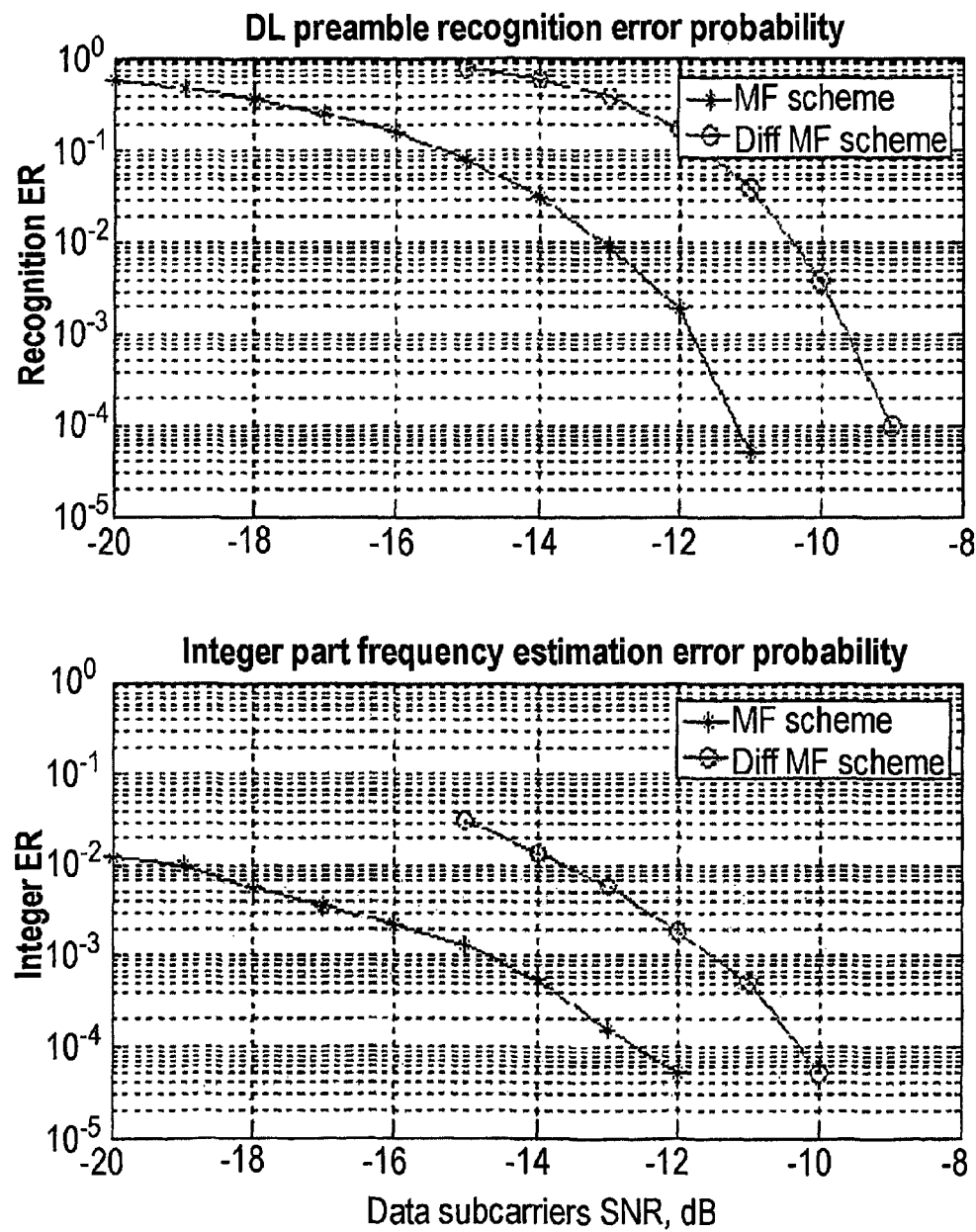
FIG. 10 illustrates one embodiment of absolute and differential MF performance.

FIG. 10 illustrates one embodiment of absolute and differential MF performance. FIG. 10 illustrates a comparison of absolute and differential MF processing in the presence of ideal timing. As shown, in AWGN channel, the MF scheme has the best recognition performance and outperforms the Diff MF scheme by 3 dB. The embodiments are not limited in this context.

Figure 11:
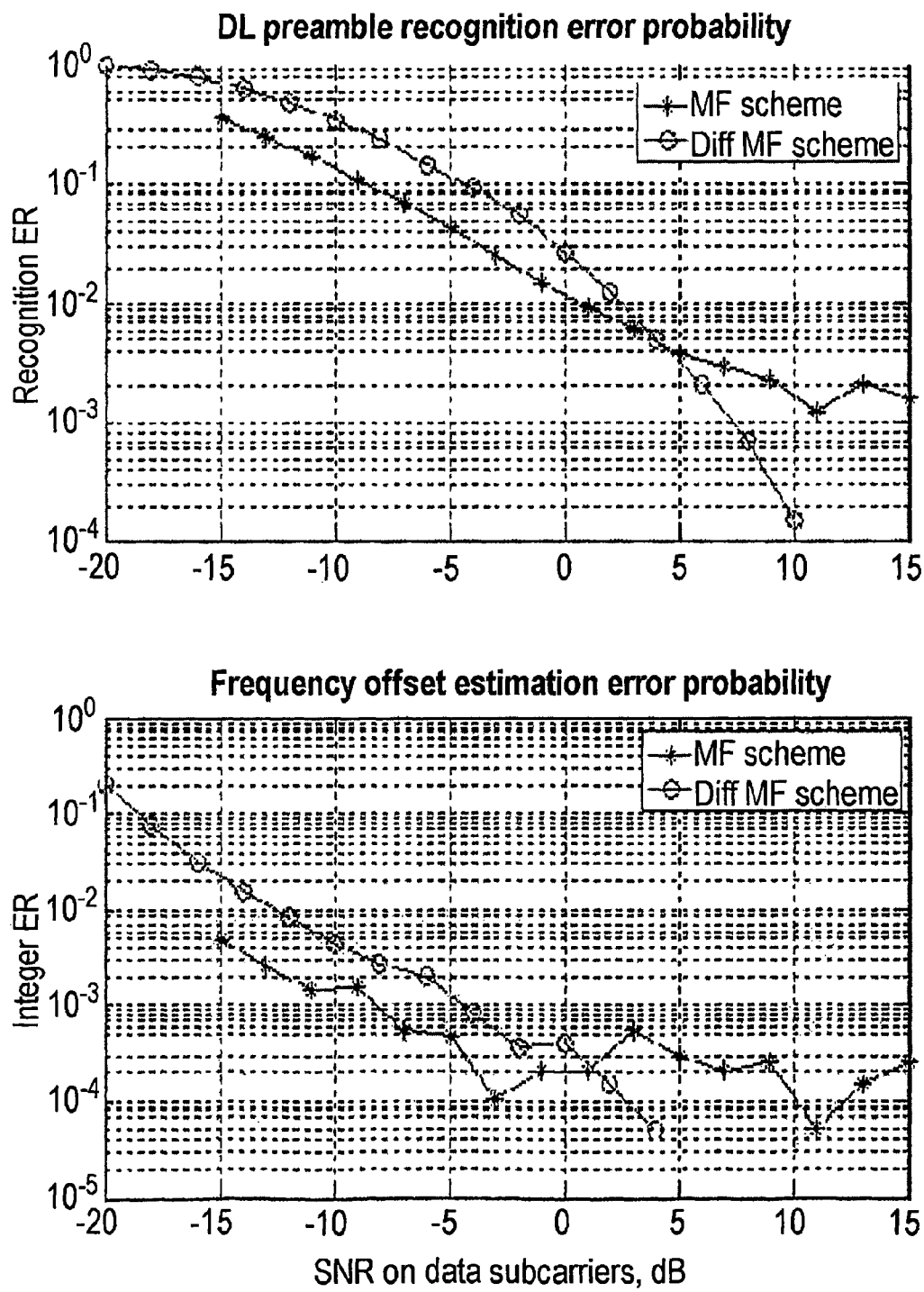
FIG. 11 illustrates one embodiment of absolute and differential MF performance.

FIG. 11 illustrates one embodiment of absolute and differential MF performance. FIG. 11 illustrates a comparison of absolute and differential MF processing in the presence of ideal timing. As shown, in ITU Pedestrian A channel, the MF scheme outperforms the Diff MF scheme only for low SNRs. After a certain SNR the recognition error rate of the MF scheme reaches a floor at approximately $10^{-3}$ while the performance of Diff MF scheme continues to improve with increased SNRs. The embodiments are not limited in this context.

Figure 12:
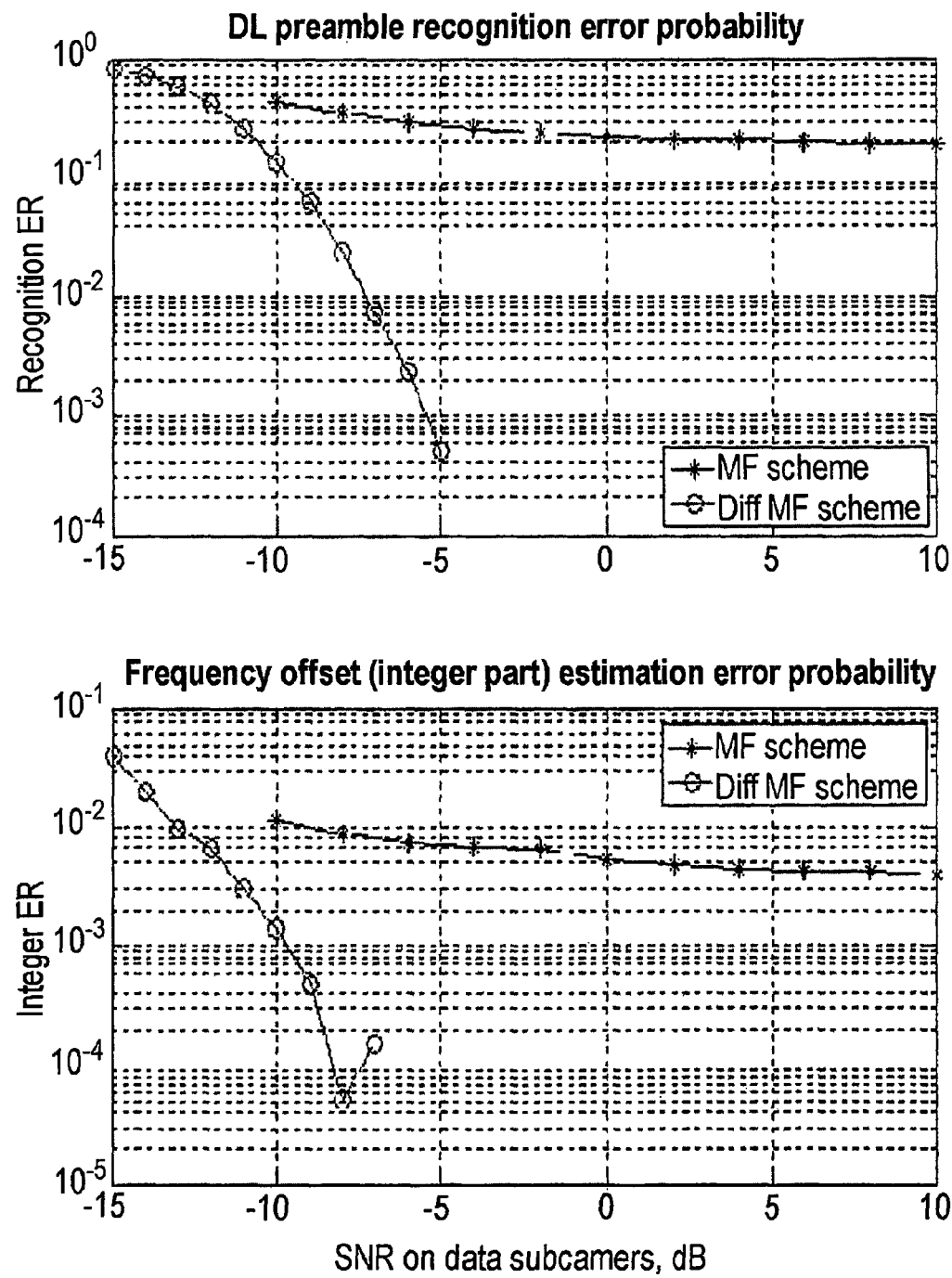
FIG. 12 illustrates one embodiment of absolute and differential MF performance.

FIG. 12 illustrates one embodiment of absolute and differential MF performance. FIG. 12 illustrates a comparison of absolute and differential MF processing in the presence of ideal timing. As shown, the recognition performance of the MF scheme in the ITU pedestrian B channel is unacceptable even for large SNRs. At the same time the performance of the Diff MF scheme is much better than in ITU pedestrian A channel. The embodiments are not limited in this context.

Another factor that may influence the performance of recognition is timing accuracy. In real over-the-air conditions, for example, timing within one Nyquist sample can be obtained only with the help of over-sampling or similar techniques.

Figure 13:
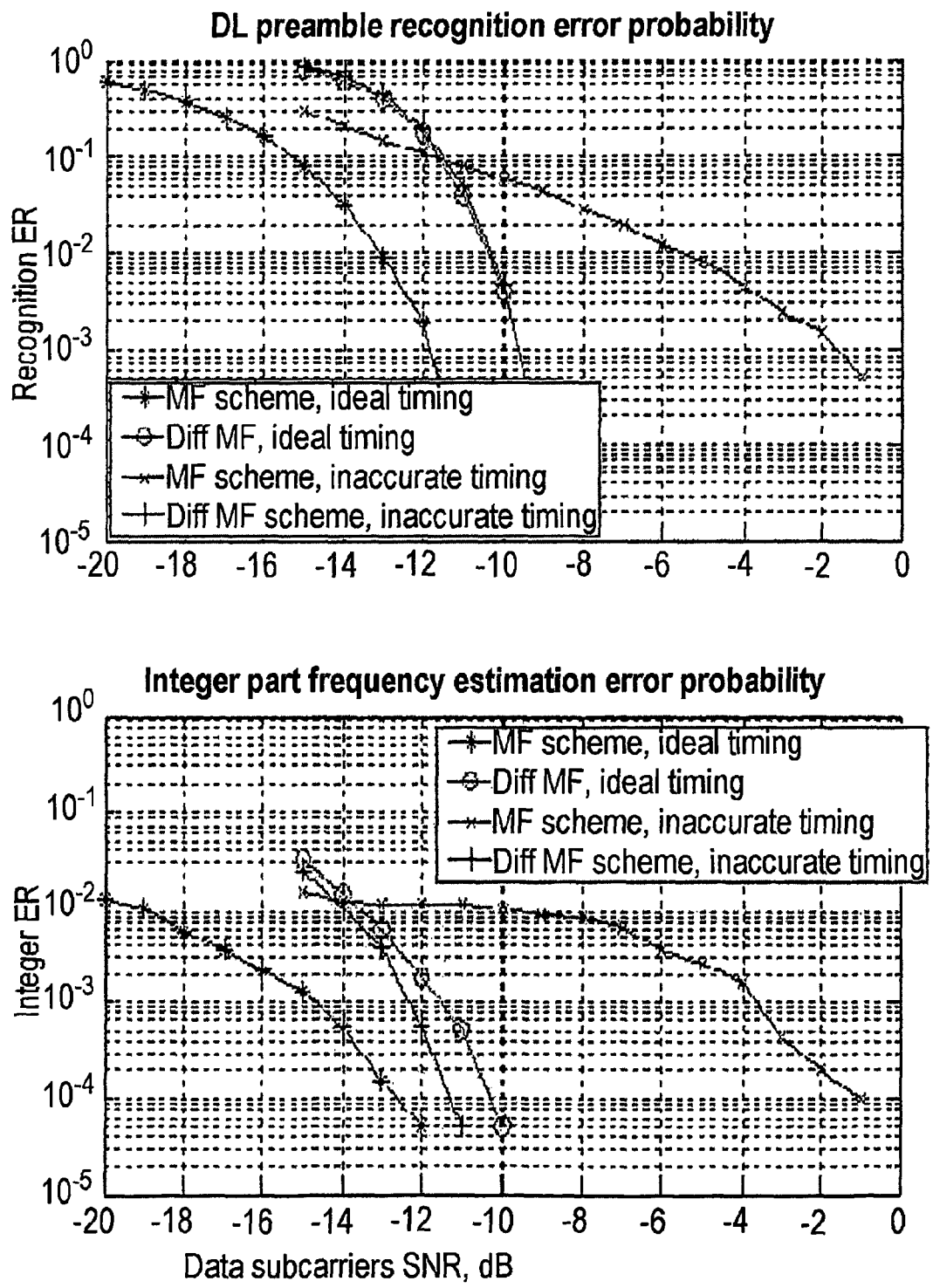
FIG. 13 illustrates one embodiment of absolute and differential MF performance.

FIG. 13 illustrates one embodiment of absolute and differential MF performance. FIG. 13 illustrates a comparison of absolute and differential MF processing in the presence of inaccurate timing. As shown, in AWGN channel, the inaccuracy of timing within one Nyquist sample leads to substantial performance degradation for the MF processing while the performance of Diff MF processing remains largely unaffected. In various embodiments, therefore, oversampling may not be required when Diff MF processing is used for recognition of the DL preamble. The embodiments are not limited in this context.

Figure 14:
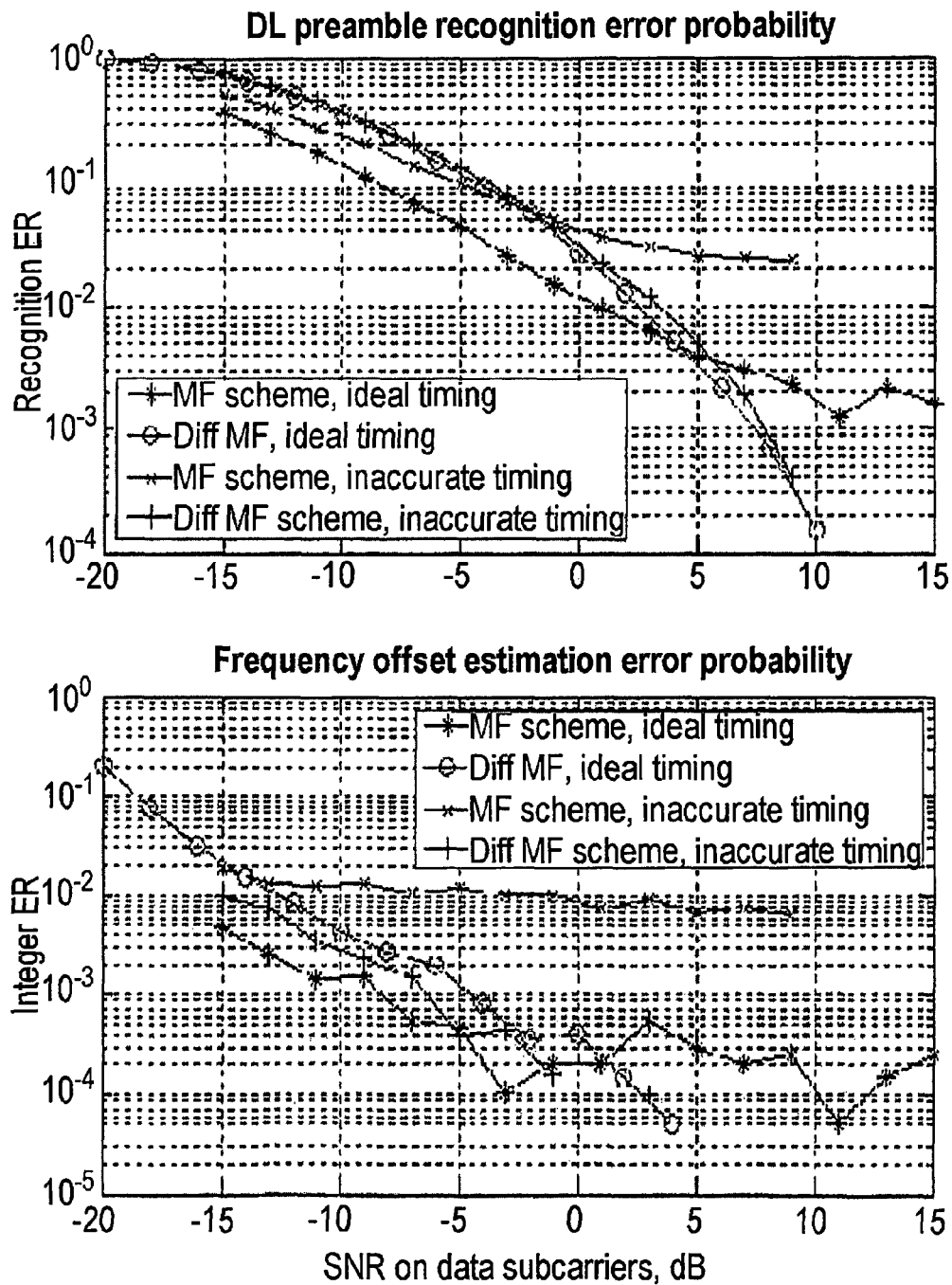
FIG. 14 illustrates one embodiment of absolute and differential MF performance.

FIG. 14 illustrates one embodiment of absolute and differential MF performance. FIG. 14 illustrates a comparison of absolute and differential MF processing in the presence of inaccurate timing. As shown, in ITU pedestrian A channel, MF processing performance degrades as the timing inaccuracy increases, while the performance of the Diff MF processing remains virtually unaffected. The embodiments are not limited in this context.

Figure 15:
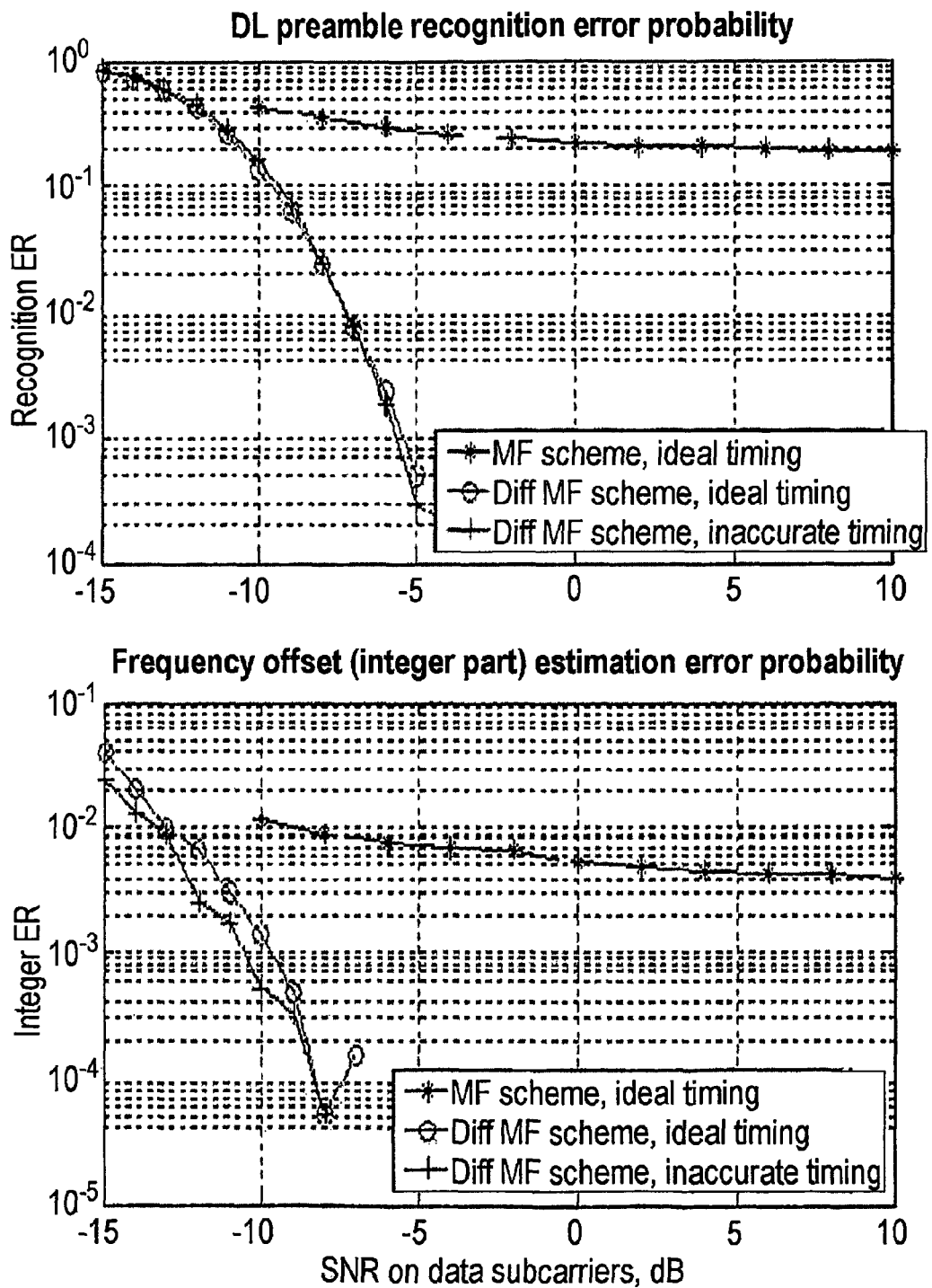
FIG. 15 illustrates one embodiment of absolute and differential MF performance.

FIG. 15 illustrates one embodiment of absolute and differential MF performance. FIG. 15 illustrates a comparison of absolute and differential MF processing in the presence of inaccurate timing. In ITU pedestrian B channel, the performance of the MF processing is unacceptable. As shown, the performance of the Diff MF processing is not affected by timing inaccuracy within one Nyquist sample. The embodiments are not limited in this context.

FIGS. 16-19 illustrate one embodiment of processing performance. In this embodiment, the performance of DL preamble processing may be demonstrated using ITU Pedestrian A and B channel models (without Doppler spread) and random frequency offset uniformly distributed within ±20 ppm interval (more than ±100 kHz for 5.4 GHz carrier) for the FFT512 mode. FIGS. 16-19 consider initial RX sampling using usual ($N_{samples}$=512) and "ternary" ($N_{samples}$=510) sampling. As shown, bold solid curves without markers represent performance for ITU Pedestrian A and $N_{samples}$=510. Bold solid curves with markers represent performance for ITU Pedestrian B and $N_{samples}$=510. For comparison, performance with usual RX sampling ($N_{samples}$=512) are represented using thin dashed curves. For FIGS. 16-19, the SNR defined for data subcarriers is used. The embodiments are not limited in this context.

Figure 16:
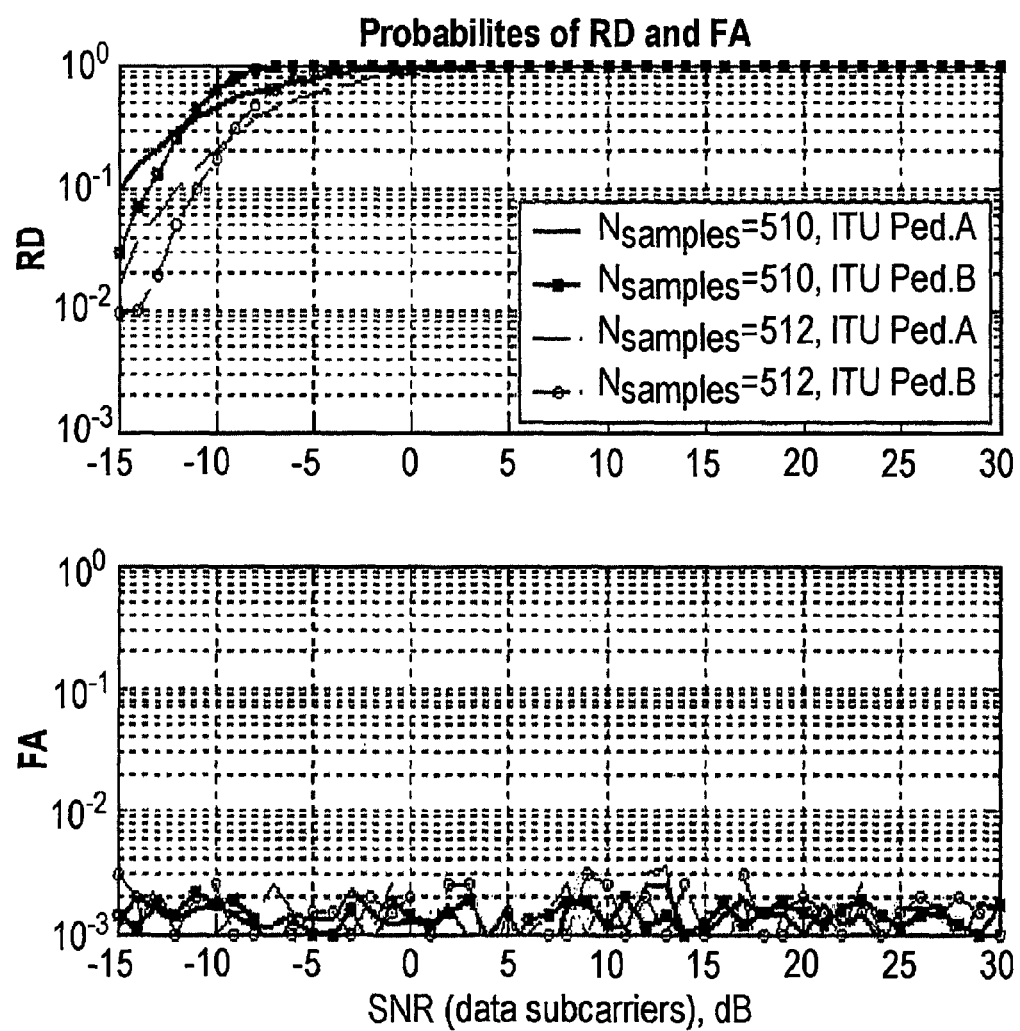
FIG. 16 illustrates one embodiment of processing performance.

FIG. 16 illustrates correct detection and false alarm. FIG. 16 illustrates the probabilities of correct (right) detection (RD) and false alarm (FA). As shown, the DL preamble processing provides RD probability more than 90% at SNR above −5 dB with target FA level (for given simulations 0.2%) over the whole operational SNR range. It can be appreciated that modified initial RX sampling ($N_{samples}$=510) provides an SNR gain (for RD performance) of approximately 3 dB in when compared to the usual RX sampling ($N_{samples}$=512). The embodiments are not limited in this context.

Figure 17:
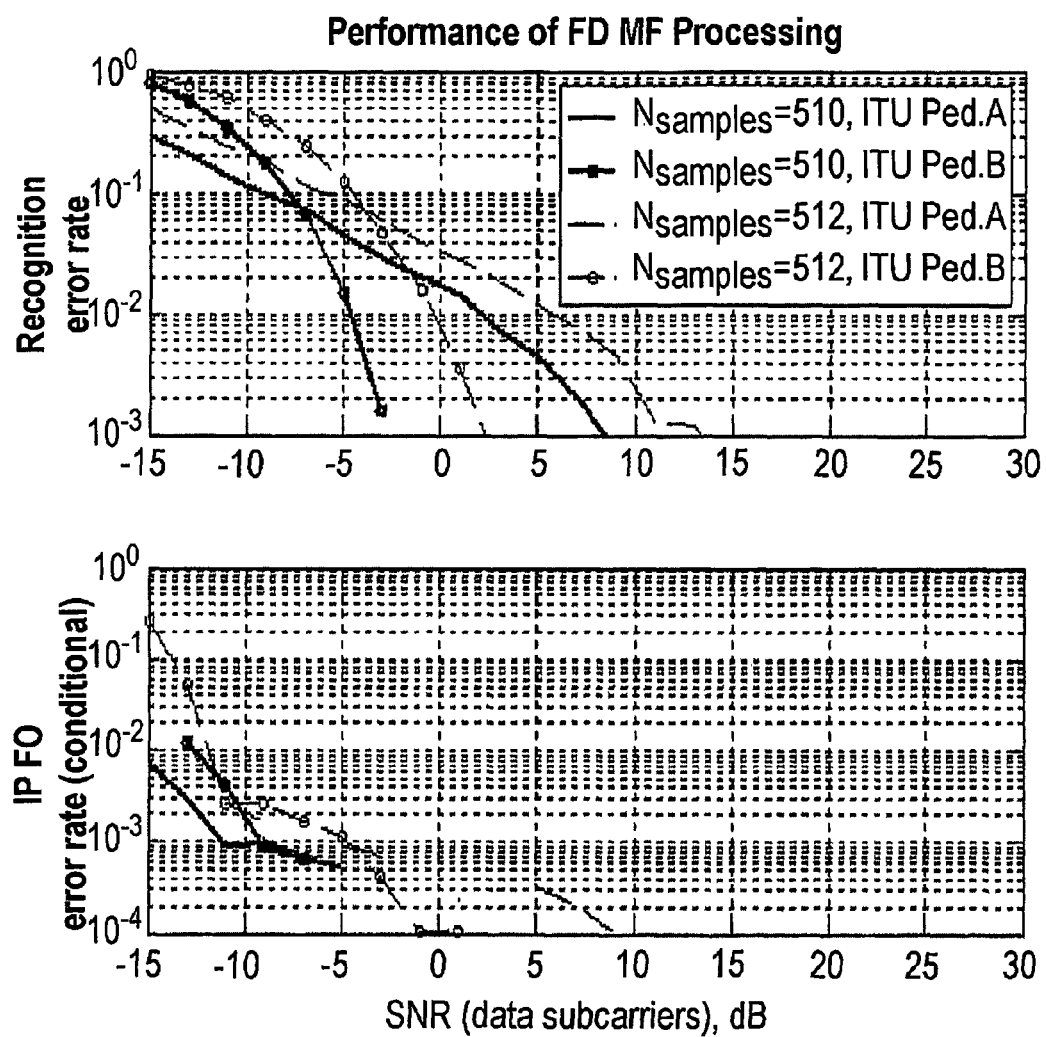
FIG. 17 illustrates one embodiment of processing performance.

FIG. 17 illustrates DL preamble recognition and IP FO estimation performance. FIG. 17 illustrates the probabilities of DL preamble recognition error (a) and IP FO estimation conditional error (b). As shown, the more than 99% probability of correct DL preamble recognition at SNRs above −5 dB (ITU Pedestrian B) is provided. In the case of correct DL preamble recognition, more than 99.9% probability of correct IP FO estimation at SNRs above −10 dB is provided. It can be appreciated that modified initial RX sampling ($N_{samples}$=510) provides a SNR gain (for DL preamble recognition performance) of approximately 2 dB in when compared to the usual RX sampling ($N_{samples}$=512). The embodiments are not limited in this context.

Figure 18:
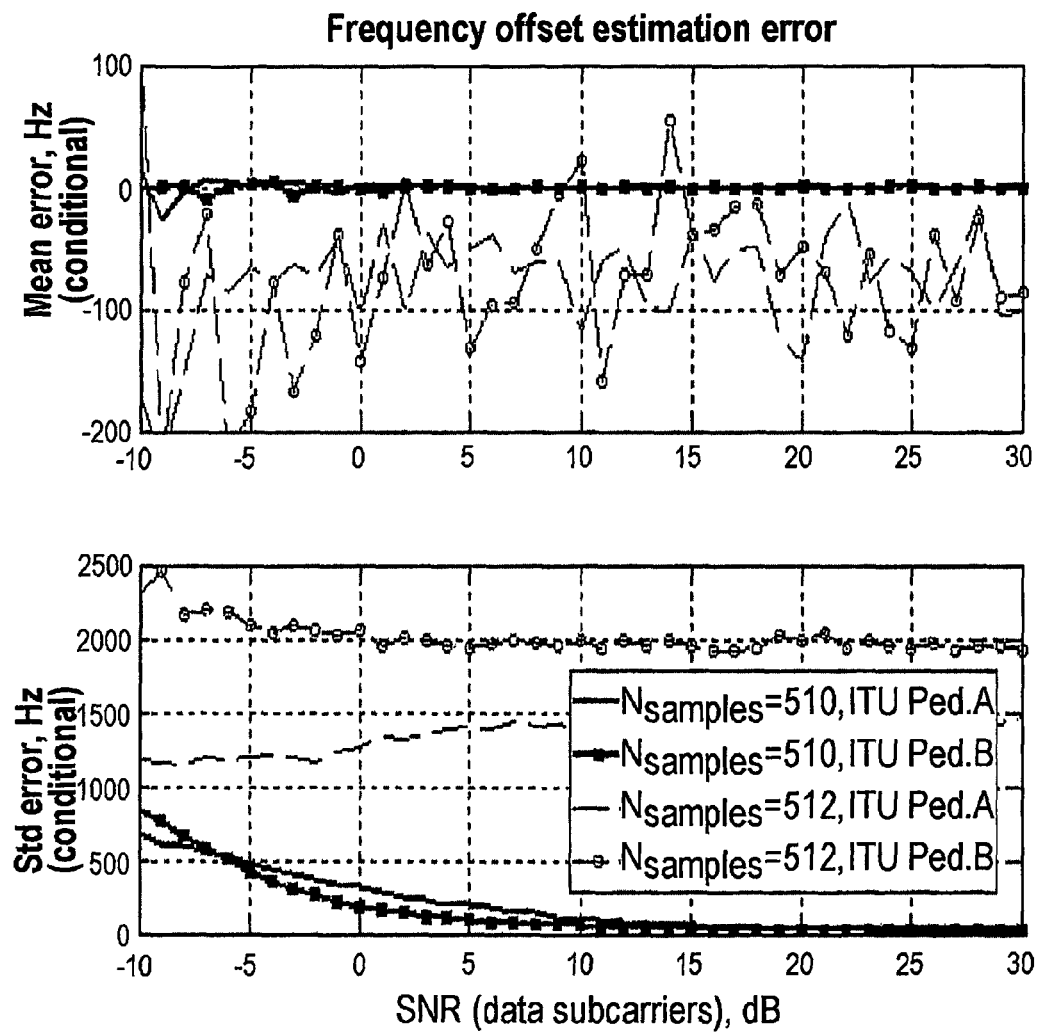
FIG. 18 illustrates one embodiment of processing performance.

FIG. 18 illustrates accuracy of frequency offset estimation. FIG. 18 illustrates the mean value and standard deviation of frequency offset estimation error. As shown, for the case of correct DL preamble recognition and correct IP FO estimation, unbiased FO estimation with standard deviation of the error below 100 Hz (≈1% of subcarrier spacing) for SNR above 3 dB (ITU Pedestrian B and $N_{samples}$=510) is provided. It can be appreciated that using the conventional sampling rate makes the frequency offset estimates biased, and the error equals approximately one fifth subcarrier spacing. The embodiments are not limited in this context.

Figure 19:
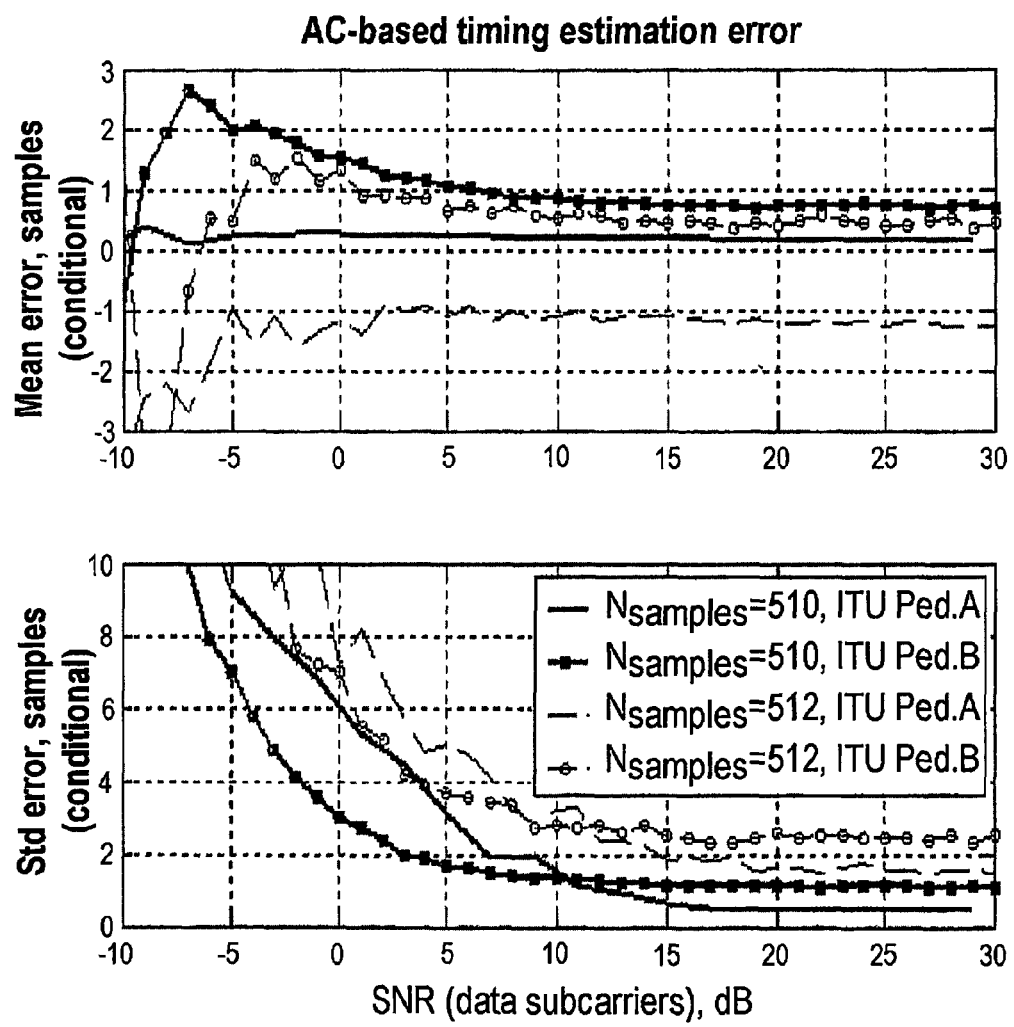
FIG. 19 illustrates one embodiment of processing performance.

FIG. 19 illustrates accuracy of symbol timing estimation based on autocorrelation. FIG. 19 illustrates autocorrelation-based symbol timing synchronization. As shown, for the case of correct DL preamble recognition and correct IP FO estimation, coarse (AC-based) DL preamble boundary synchronization with standard deviation of the error below 2 samples for SNR values above 5 dB is provided. It can be appreciated that the performance of the symbol timing synchronization can be enhanced by using the complementary block (e.g., time domain matched filter). The embodiments are not limited in this context.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 20:
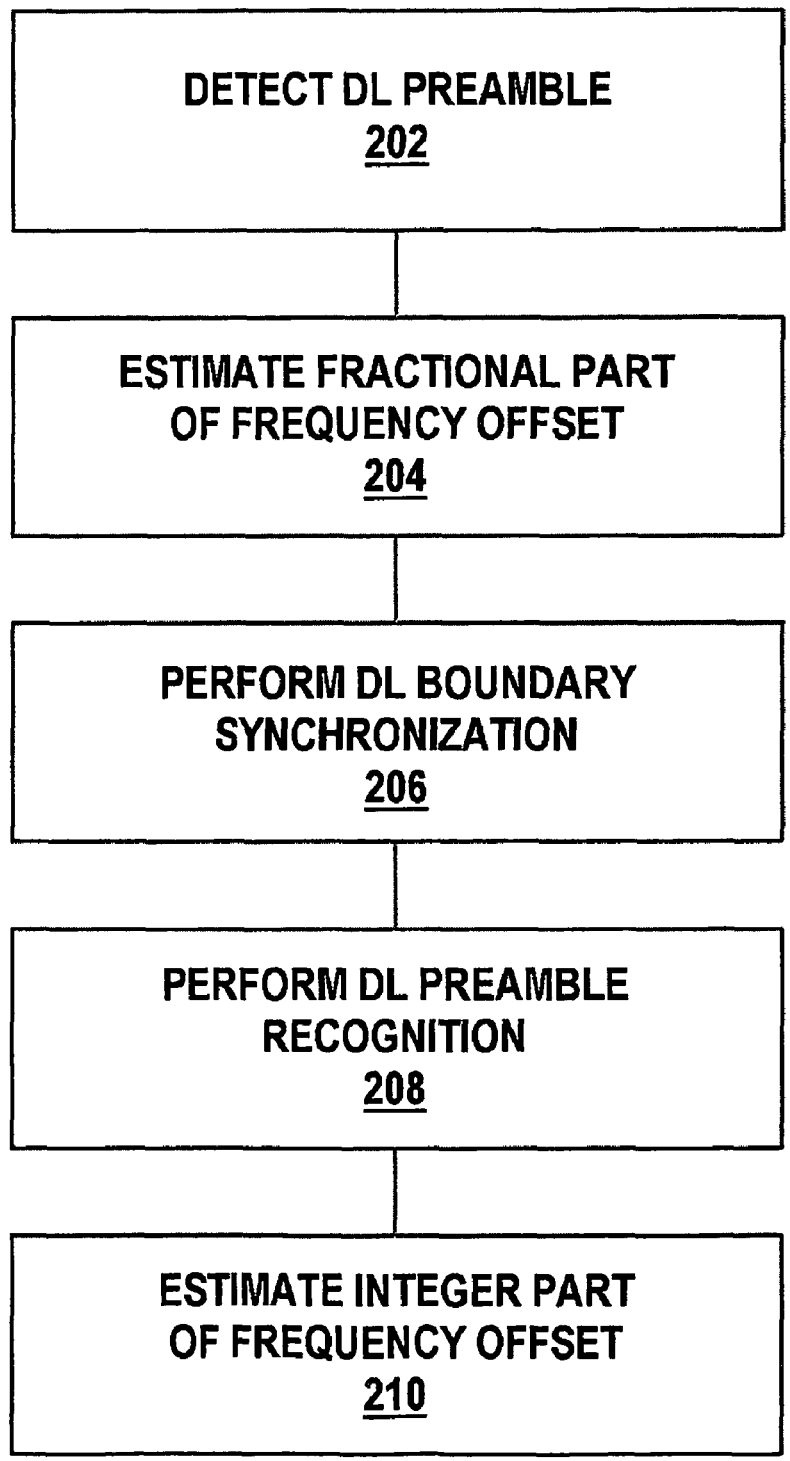
FIG. 20 illustrates one embodiment of a logic flow.

FIG. 20 illustrates one embodiment of a logic flow. FIG. 20 illustrates a logic flow 200 for DL preamble processing. In various embodiments, the logic flow 200 may be performed by various systems, nodes, and/or blocks. It is to be understood that the logic flow 200 may be implemented by various other types of hardware, software, and/or combination thereof. The embodiments are not limited in this context.

The logic flow 200 may comprise detecting a DL preamble (block 202). In various embodiments, the DL preamble may be detected based on an autocorrelation response of received samples. The downlink preamble may be detected by comparing an adaptive threshold against a magnitude autocorrelation response. The samples may comprise a periodic sequence having three periods. In various implementations, the samples may be received at a ternary sampling and/or a triple sampling rate. The embodiments are not limited in this context.

The logic flow 200 may comprise estimating a fractional part of frequency offset (FP FO) (block 204). In various embodiments, the FP FO estimate may be based on an autocorrelation response, for example. The embodiments are not limited in this context.

The logic flow 200 may comprise performing downlink preamble boundary synchronization (block 206). In various embodiments, performing downlink preamble boundary synchronization may comprise searching an autocorrelation response and determining a maximum of the autocorrelation response. The embodiments are not limited in this context.

The logic flow 200 may comprise performing downlink preamble recognition (block 208) and estimating an integer part of frequency offset (IP FO) (block 210). In various implementations, downlink preamble recognition may be based on an index of the downlink preamble. In various embodiments, the IP FO estimate and DL preamble index may be determined by performing matched filter processing across FD samples. Matched filter processing may comprise differential matched filter processing, for example. The embodiments are not limited in this context.

In various implementations, modification of initial RX sampling rate (ternary or triple) may provide lower complexity DL preamble processing and better performance of initial acquisition. In various embodiments, modification of the initial RX sampling allows the use of low complexity detection schemes and gives an SNR gain of approximately 3 dB in comparison with usual RX sampling. Both ternary and triple approaches are applicable and the choice between them can be made based on implementation complexity analysis. The described embodiments may have low complexity synchronization algorithms and demonstrate good performance in frequency offset and symbol timing estimation. The embodiments are not limited in this context.

In various embodiments, adaptive thresholding may use current estimate of noise power with compensation of fractional part of frequency offset. In various implementations, right detection probability may be enhanced, and the adaptive threshold value may be proportional to current noise power estimate and maintain the target false alarm probability level over the whole operational SNR range. In various embodiments, the algorithm for DL preamble identification (based on FD MF processing) has low complexity and good performance: more than 99% probability of correct DL preamble recognition at SNRs above −5 dB (ITU Pedestrian B). The embodiments are not limited in this context.

In various embodiments, frequency domain matched filtering with differential detection of the DL preamble codeword may allow simultaneous estimating the integer part of frequency offset and DL preamble recognition with better performance. In various implementations, the procedure for IP FO estimation (based on FD MF processing) has wide FO resolution range—up to ±12 triple subcarrier spacings (for FFT512). In various embodiments, the differential detection of codeword substantially enhances the performance of the DL preamble identification and IP FO estimation in hostile frequency-selective channels.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the processing system 100 may be illustrated using a particular communications media by way of example, it may be appreciated that the principles and techniques discussed herein may be implemented using any type of communication media and accompanying technology. For example, the processing system 100 may be implemented as a wired communication system, a wireless communication system, or a combination of both. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an ASIC, PLD, DSP, and so forth. In yet another example, an embodiment may be implemented by any combination of programmed general-purpose computer components and custom hardware components. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
an autocorrelator node to determine an autocorrelation response of samples comprising a periodic sequence having two or more periods and to detect a downlink preamble based on the autocorrelation response, wherein a number of samples within a preamble duration is a multiple of two or more;
a frequency domain matched filter processing node to perform downlink preamble recognition based on a maximum peak of a frequency domain matched filter response and on an index of the downlink preamble;
a correction node to estimate and correct a fractional part of a frequency offset based on the autocorrelation response; and
a noise estimator node to determine an adaptive threshold value, wherein the autocorrelator node is to detect the downlink preamble by comparing the adaptive threshold against a magnitude autocorrelation response.

2. The apparatus of claim 1, wherein the autocorrelator node is to receive samples at an initial sampling rate, wherein a number of samples within a preamble duration is a multiple of the number of the periods in the preamble.

3. The apparatus of claim 1, further comprising a search node to search the autocorrelation response and to perform downlink preamble boundary synchronization based on a maximum of the autocorrelation response.

4. The apparatus of claim 1, further comprising a fractional part of frequency offset correction node to rotate a phase of time domain samples representing a received downlink preamble to obtain the periodic sequence having two or more periods.

5. The apparatus of claim 1, further comprising a buffer summator node to combine a periodic sequence of time domain samples having two or more periods into one period to reduce additive noise power.

6. The apparatus of claim 1, further comprising a Fast Fourier Transform node to transform a sequence of time-domain samples representing one period of a downlink preamble to frequency domain samples representing a binary codeword of a received downlink preamble.

7. The apparatus of claim 1, wherein the frequency domain matched filter processing node is to estimate an integer part of frequency offset based on a shift of the maximum peak of the frequency domain matched filter response.

8. The apparatus of claim 1, wherein the frequency domain matched filter processing node is to perform differential matched filtering across frequency domain samples.

9. A system, comprising:
at least one antenna; and
a processing apparatus to couple to said at least one antenna, said processing apparatus comprising:
an autocorrelator node to determine an autocorrelation response of samples comprising a periodic sequence having two or more periods and to detect a downlink preamble based on the autocorrelation response, wherein a number of samples within a preamble duration is a multiple of two or more; and
a frequency domain matched filter processing node to perform downlink preamble recognition based on a maximum peak of a frequency domain matched filter response and on an index of the downlink preamble;
a correction node to estimate and correct a fractional part of a frequency offset based on the autocorrelation response; and
a noise estimator node to determine an adaptive threshold value, wherein the autocorrelator node is to detect the downlink preamble by comparing the adaptive threshold against a magnitude autocorrelation response.

10. The system of claim 9, wherein the autocorrelator node is to receive samples at and initial sampling rate, wherein a number of samples within a preamble duration is a multiple of the number of the periods in the preamble.

11. The system of claim 9, further comprising a search node to search the autocorrelation response and to perform downlink preamble boundary synchronization based on a maximum of the autocorrelation response.

12. The system of claim 9, further comprising a fractional part of frequency offset correction node to rotate a phase of time domain samples representing a received downlink preamble to obtain the periodic sequence having two or more periods.

13. The system of claim 9, further comprising a buffer summator node to combine a periodic sequence of time domain samples having two or more periods into one period to reduce additive noise power.

14. The system of claim 9, further comprising a Fast Fourier Transform node to transform a sequence of time-domain samples representing one period of a downlink preamble to frequency domain samples representing a binary codeword of a received downlink preamble.

15. The system of claim 9, wherein the frequency domain matched filter processing node is to estimate an integer part of frequency offset based on a shift of the maximum peak of the frequency domain matched filter response.

16. The system of claim 9, wherein the matched filter processing node is to perform differential matched filtering across frequency domain samples.

17. A method, comprising:
determining an autocorrelation response of samples comprising a periodic sequence having two or more periods, wherein a number of samples within a preamble duration is a multiple of two or more;
detecting a downlink preamble based on the autocorrelation response;
performing downlink preamble recognition based on a maximum peak of a frequency domain matched filter response and on an index of the downlink preamble;
estimating and correcting a fractional part of a frequency offset based on the autocorrelation response;
determining an adaptive threshold value; and
detecting the downlink preamble by comparing the adaptive threshold against a magnitude autocorrelation response.

18. The method of claim 17, further comprising receiving samples at an initial sampling rate, wherein a number of samples within a preamble duration is a multiple of the number of the periods in the preamble.

19. The method of claim 17, further comprising:
searching the autocorrelation response; and
performing downlink preamble boundary synchronization based on a maximum of the autocorrelation response.

20. The method of claim 17, further comprising rotating a phase of time domain samples representing a received downlink preamble to obtain the periodic sequence having two or more periods.

21. The method claim 17, further comprising combining a periodic sequence of time domain samples having two or more periods into one period to reduce additive noise power.

22. The method of claim 17, further comprising transforming a sequence of time domain samples representing one period of a downlink preamble to frequency domain samples representing a binary codeword of a received downlink preamble.

23. The method of claim 17, further comprising estimating an integer part of frequency offset based on a shift of the maximum peak of the frequency domain matched filter response.

24. The method of claim 17, further comprising performing differential matched filtering across frequency domain samples.

25. An article comprising a non-transitory computer-readable storage medium containing instructions that if executed by a processor enable a system to:
   determine an autocorrelation response of samples comprising a periodic sequence having two or more periods, wherein a number of samples within the preamble duration is a multiple of two or more;
   detect a downlink preamble based on the autocorrelation response;
   perform downlink preamble recognition based on a maximum peak of a frequency domain matched filter response and on an index of the downlink preamble;
   estimate and correct a fractional part of a frequency offset based on the autocorrelation response; and
   determine an adaptive threshold value and to detect the downlink preamble by comparing the adaptive threshold against a magnitude autocorrelation response.

26. The article of claim 25, further comprising instructions that if executed enable a system to receive samples at initial sampling rate, wherein a number of samples within the preamble duration is a multiple of the number of the periods in the preamble.

27. The article of claim 25, further comprising instructions that if executed enable a system to:
   search the autocorrelation response; and
   perform downlink preamble boundary synchronization based on a maximum of the autocorrelation response.

28. The article of claim 25, further comprising instructions that if executed enable a system to rotate a phase of time domain samples representing a received downlink preamble to obtain the periodic sequence having two or more periods.

29. The article claim 25, further comprising instructions that if executed enable a system to combine a periodic sequence of time domain samples having two or more periods into one period to reduce additive noise power.

30. The article claim 25, further comprising instructions that if executed enable a system to transform a sequence of time domain samples representing one period of downlink preamble to frequency domain samples representing a binary codeword of received downlink preamble.

31. The article of claim 25, further comprising instructions that if executed enable a system to estimate an integer part of frequency offset based on a shift of the maximum peak of the frequency domain matched filter response.

32. The article of claim 25, further comprising instructions that if executed enable a system to perform differential matched filtering across frequency domain samples.

* * * * *